(12) United States Patent
Shimanuki et al.

(10) Patent No.: US 10,717,136 B2
(45) Date of Patent: Jul. 21, 2020

(54) CUTTING INSERT

(71) Applicant: SUMITOMO ELECTRIC HARDMETAL CORP., Itami (JP)

(72) Inventors: Kouji Shimanuki, Itami (JP); Gaku Harada, Itami (JP); Yasuyuki Kanada, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 0 days.

(21) Appl. No.: 16/096,525

(22) PCT Filed: Mar. 8, 2017

(86) PCT No.: PCT/JP2017/009245
§ 371 (c)(1),
(2) Date: Oct. 25, 2018

(87) PCT Pub. No.: WO2017/187806
PCT Pub. Date: Nov. 2, 2017

(65) Prior Publication Data
US 2019/0143419 A1    May 16, 2019

(30) Foreign Application Priority Data

Apr. 27, 2016 (JP) ................................. 2016-089268

(51) Int. Cl.
*B23B 27/22*    (2006.01)
*B23B 27/20*    (2006.01)
(Continued)

(52) U.S. Cl.
CPC .............. *B23B 27/20* (2013.01); *B23B 27/04* (2013.01); *B23B 27/065* (2013.01); *B23B 27/14* (2013.01);
(Continued)

(58) Field of Classification Search
CPC ........ B23B 2200/086; B23B 2200/323; B23B 27/04; B23B 27/22; B23B 27/20;
(Continued)

(56) References Cited

U.S. PATENT DOCUMENTS 4,969,779 A * 11/1990 Barten .................. B23B 27/045
407/114
5,375,948 A    12/1994 Lindstedt
(Continued)

FOREIGN PATENT DOCUMENTS

| CN | 101274371 A | 10/2008 |
|---|---|---|
| CN | 102458730 A | 5/2012 |

(Continued)

*Primary Examiner* — Sara Addisu
(74) *Attorney, Agent, or Firm* — Baker Botts L.L.P.; Michael A. Sartori

(57) ABSTRACT

The edge portion includes an upper surface, a side surface, and a land surface. The side surface has a front side surface and a pair of lateral side surfaces. An intersection between the land surface and the front side surface forms a front cutting edge. An intersection between the land surface and each of the pair of lateral side surfaces form a corresponding one of a pair of lateral cutting edges. The edge portion contains 80 vol % or more of diamond. A chip breaker recess is provided between the upper surface and the land surface. The surfaces forming the chip breaker recess include a rake face and a breaker wall surface. The upper surface has a front edge portion opposite to the front cutting edge from the chip breaker recess. A pair of protruding portions are provided to extend from the front edge portion toward the front cutting edge.

17 Claims, 10 Drawing Sheets

(51) Int. Cl.
*B23B 27/14* (2006.01)
*B23B 27/06* (2006.01)
*B23B 27/04* (2006.01)

(52) U.S. Cl.
CPC ............ *B23B 27/148* (2013.01); *B23B 27/22* (2013.01); *B23B 2200/0423* (2013.01); *B23B 2200/086* (2013.01); *B23B 2200/323* (2013.01); *B23B 2226/31* (2013.01)

(58) Field of Classification Search
CPC ..... B23B 27/14; B23B 27/065; B23B 27/148; B23B 2200/0423; B23B 2226/31; B23B 2200/081; B23B 2200/321; B23B 27/143; B23B 27/045; Y10T 407/235; Y10T 407/23; Y10T 407/2268
See application file for complete search history.

(56) References Cited

U.S. PATENT DOCUMENTS

| | | | | |
|---|---|---|---|---|
| 5,511,911 | A * | 4/1996 | Katbi | B23B 27/045 407/114 |
| 5,676,495 | A * | 10/1997 | Katbi | B23B 27/045 407/114 |
| 5,725,334 | A * | 3/1998 | Paya | B23B 27/045 407/104 |
| 5,951,215 | A * | 9/1999 | Paya | B23B 27/045 407/113 |
| 5,975,812 | A * | 11/1999 | Friedman | B23B 27/045 407/113 |
| 6,238,147 | B1 * | 5/2001 | Tagtstrom | B23B 27/045 407/114 |
| RE37,595 | E * | 3/2002 | Lindstedt | B23B 27/045 407/110 |
| 7,883,300 | B1 * | 2/2011 | Simpson, III | B23B 27/045 407/113 |
| 8,784,014 | B2 * | 7/2014 | Onodera | B23B 27/045 407/114 |
| 9,108,248 | B2 * | 8/2015 | Fujii | B23B 27/045 |
| 10,384,268 | B1 * | 8/2019 | Kertsman | B23B 27/045 |
| 2001/0014259 | A1 * | 8/2001 | Inayama | B23B 27/045 407/116 |
| 2003/0170081 | A1 * | 9/2003 | Andersson | B23B 27/045 407/116 |
| 2006/0269367 | A1 | 11/2006 | Havrda | |
| 2007/0207715 | A1 | 9/2007 | Webb | |
| 2008/0240874 | A1 * | 10/2008 | Nagaya | B23B 27/045 407/113 |
| 2008/0240875 | A1 * | 10/2008 | Nagaya | B23B 27/045 407/113 |
| 2009/0035076 | A1 | 2/2009 | Hecht | |
| 2012/0051854 | A1 | 3/2012 | Pretorius | |
| 2012/0297941 | A1 * | 11/2012 | Inoue | B23B 27/045 82/1.11 |
| 2013/0192431 | A1 | 8/2013 | Inoue | |
| 2014/0290450 | A1 * | 10/2014 | Fujii | B23B 27/045 82/1.11 |
| 2015/0023744 | A1 | 1/2015 | Wu et al. | |
| 2016/0243624 | A1 * | 8/2016 | Tomoda | B23B 27/143 |

FOREIGN PATENT DOCUMENTS

| | | | |
|---|---|---|---|
| EP | 0 382 555 A2 | 8/1990 | |
| EP | 0 568 512 A1 | 11/1993 | |
| JP | 06-008013 A | 1/1994 | |
| JP | H07-314204 A | 12/1995 | |
| JP | H08-508211 A | 9/1996 | |
| JP | 09174308 A * | 7/1997 | ........... B23B 27/045 |
| JP | 2003-025135 A | 1/2003 | |
| JP | 2006-341321 A | 12/2006 | |
| JP | 2008-272923 A | 11/2008 | |
| JP | 2008272923 A * | 11/2008 | |
| JP | 5639656 B2 | 12/2014 | |
| WO | 96/33037 A1 | 10/1996 | |

\* cited by examiner

CUTTING INSERT

TECHNICAL FIELD

The present invention relates to cutting inserts. The present application claims the priority benefit of Japanese Patent Application No. 2016-089268 filed on Apr. 27, 2016, the contents of which are incorporated herein by reference in its entirety.

BACKGROUND ART

Japanese Patent Laying-Open No. 2008-272923 (PTL 1) discloses a cutting insert that grooves, for example, a workpiece such as steel. The material for an edge portion of the cutting insert is cemented carbide. However, the use of cemented carbide easily welds the workpiece to a blade tip. This leads to a shorter lifetime of the cutting insert, so that the workpiece cannot have good surface quality.

Japanese Patent Laying-Open No. 7-314204 (PTL 2) discloses a cutting insert, where the material for an edge portion is a diamond sintered compact and the material for a substrate holding the edge portion is cemented carbide. Changing the material for the edge portion from cemented carbide to diamond sintered compact can significantly reduce welding of a workpiece to the edge portion. However, diamond is difficult to process because it is a material with very high hardness which easily chips. The cutting insert thus has a breaker wall provided in the substrate, not in the edge portion.

CITATION LIST

Patent Literature

PTL 1: Japanese Patent Laying-Open No. 2008-272923
PTL 2: Japanese Patent Laying-Open No. 07-314204

SUMMARY OF INVENTION

A cutting insert according to an embodiment of the present invention includes a body and an edge portion provided on the body. The edge portion includes an upper surface, a side surface, and a land surface. The side surface has a front side surface and a pair of lateral side surfaces adjacent to the front side surface. An intersection between the land surface and the front side surface form a front cutting edge. An intersection between the land surface and each of the pair of lateral side surfaces forms a corresponding one of a pair of lateral cutting edges. The edge portion contains 80 vol % or more of diamond. A chip breaker recess is provided between the upper surface and the land surface. Surfaces forming the chip breaker recess include a rake face continuous with the land surface and a breaker wall surface continuous with the upper surface. The upper surface has a front edge portion opposite to the front cutting edge from the chip breaker recess. The pair of protruding portions are provided to extend from the front edge portion toward the front cutting edge.

DETAILED DESCRIPTION

Figure 1:
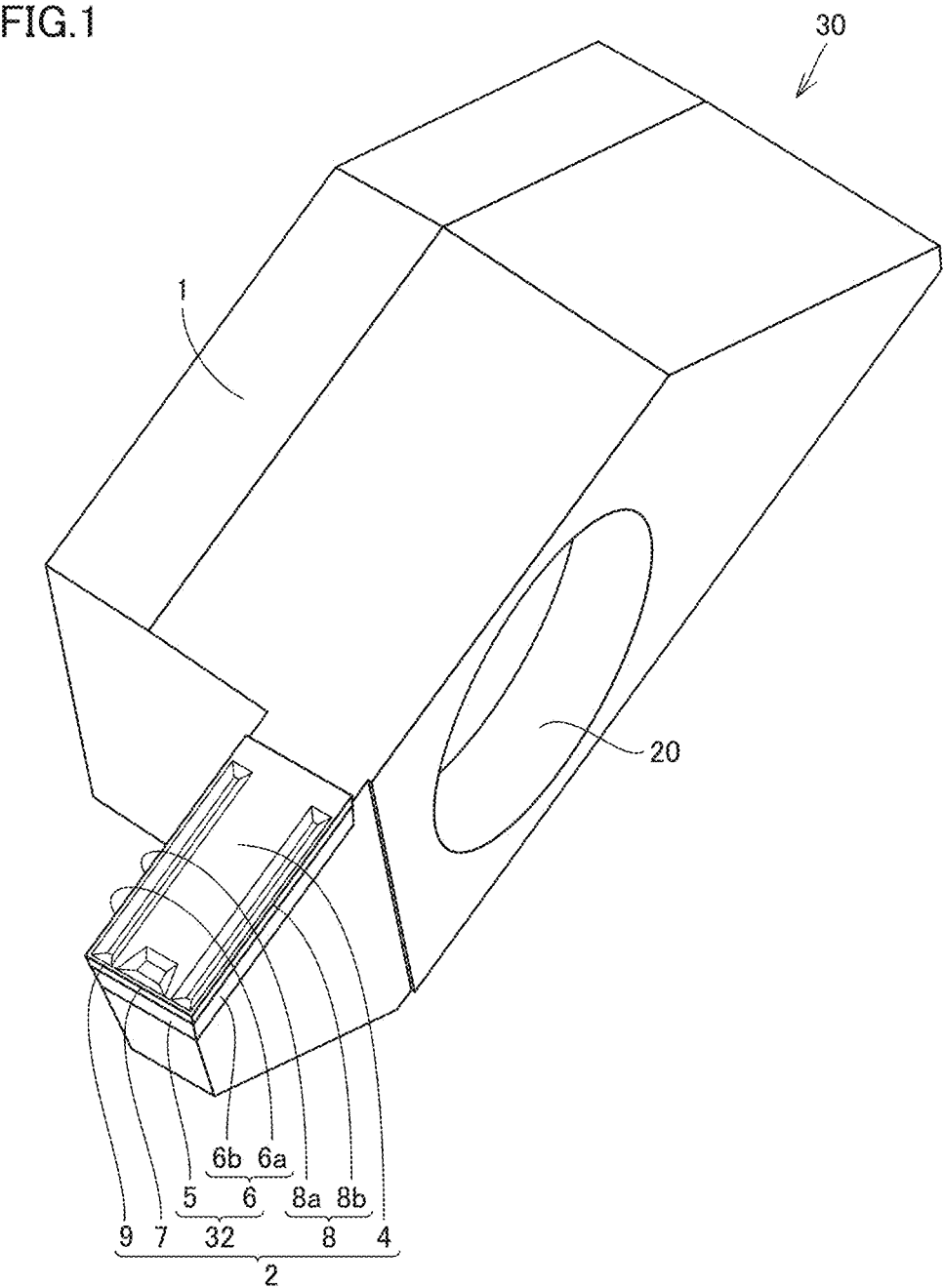
FIG. 1 is a schematic perspective view illustrating the structure of a cutting insert according to Embodiment 1.

Problem to be Solved by the Present Disclosure

The material for the breaker wall of the cutting insert described in Japanese Patent Laying-Open No. 07-314204 is cemented carbide. When a workpiece such as aluminum alloy is cut with the cutting insert, the direction in which a chip flows can be controlled, but the chip cannot be divided due to high toughness of the material. If the chip is not divided, the workpiece substantially cannot be processed because the elongated chip is twisted around the workpiece. The cutting insert has a breaker wall provided only at the location remote from the blade tip in the grooving direction and has no breaker wall provided at a location in the cross-feed direction. In cross-feeding with the cutting insert, accordingly, a chip cannot be divided because the chip cannot be controlled.

An object of an aspect of the present invention is to provide a cutting tool capable of dividing a chip in both of grooving and cross-feeding.

Advantageous Effect of the Present Disclosure

According to an aspect of the present invention, a cutting tool capable of dividing a chip in both of grooving and cross-feeding can be provided.

DESCRIPTION OF EMBODIMENTS

A summary of embodiments of the present invention will now be described.

(1) A cutting insert 30 according to an aspect of the present invention includes a body 1 and an edge portion 2 provided on body 1. Edge portion 2 includes an upper surface 4, a side surface 32, and a land surface 9. Side surface 32 has a front side surface 5 and a pair of lateral side surfaces 6 adjacent to front side surface 5. An intersection between land surface 9 and front side surface 5 forms a front cutting edge 7. An intersection between land surface 9 and each of the pair of lateral side surfaces 6 forms a corresponding one of a pair of lateral cutting edges 8. Edge portion 2 contains 80 vol % or more of diamond. A chip breaker recess 10 is provided between upper surface 4 and land surface 9. The surfaces forming chip breaker recess 10 include a rake face 11 continuous with the land surface and a breaker wall surface 24 continuous with upper surface 4. Upper surface 4 has a front edge portion 31 opposite to front cutting edge 7 from chip breaker recess 10. A pair of protruding portions 12 are provided to extend from front edge portion 31 toward front cutting edge 7.

In cutting insert 30 according to above (1), the pair of protruding portions 12 are provided to extend from front edge portion 31 toward front cutting edge 7. The portion of chip breaker recess 10 between the pair of protruding portions 12 allows a chip to be divided into short pieces in grooving. The portion of chip breaker recess 10 located between each of the pair of protruding portions 12 and a corresponding one of the pair of lateral side surfaces 6 allows a chip to be divided into short pieces in cross-feeding. Consequently, a chip can be divided into short pieces when grooving and cross-feeding are performed on, for example, a workpiece having high toughness, such as aluminum alloy. A decrease in machining accuracy, which is caused when a workpiece is cut with a chip twisted therearound, can thus be minimized. Also, the interruption of cutting due to a chip twisted around the workpiece can be prevented or reduced. As a result, cutting can be automated.

(2) In cutting insert 30 according to above (1), each of the pair of protruding portions 12 may be continuous with land surface 9. When the protruding portion and the land surface are continuous with each other, a ratio of a lapped surface (the lapped surface will be described below in detail) is higher than when the protruding portion and the land surface are apart from each other. Thus, welding of the blade tip can be reduced effectively during grooving. Welding of the blade tip can be reduced effectively especially when a material having high toughness among aluminums and aluminum alloys is used.

(3) In cutting insert 30 according to above (2), a value (G/L ratio) obtained by dividing a sum G of a length X1 of a boundary 33b between one rib 12b of the pair of protruding portions 12 and land surface 9 and a length X2 of a boundary 33a between the other rib 12a of the pair of protruding portions 12 and land surface 9 by a length L of front cutting edge 7 may be 0.1 or less. This reduces a curl diameter of a chip, allowing the chip to have a spiral shape. Consequently, damage to the machined wall surface, which is caused by a chip contacting the machined wall surface, can be prevented or reduced.

(4) In cutting insert 30 according to above (1), each of the pair of protruding portions 12 may be apart from land surface 9. When the protruding portion and the land surface are apart from each other, a cutting fluid is supplied to the blade tip more efficiently than when the protruding portion and the land surface are continuous with each other. A lubricating effect of the blade tip can thus be obtained efficiently. Consequently, especially when a material containing a hard substance such as silicon (Si) among aluminums and aluminum alloys is cut, the lubricating effect of the blade tip can be obtained efficiently.

(5) In cutting insert 30 according to above (4), in a cross-section that passes through a tip 29b of each of the pair of protruding portions 12 and is perpendicular to the direction in which front cutting edge 7 extends, a value obtained by dividing a height y from a lowest position 26b of each of the pair of protruding portions to a deepest portion 23c of chip breaker recess 10 by a depth H of chip breaker recess 10 at deepest portion 23c may be 0.3 or more and less than 1.0. This can reduce a chip length.

(6) In cutting insert 30 according to any one of above (1) to (5), a spacing between the pair of protruding portions 12 may decrease as apart from front cutting edge 7.

(7) In cutting insert 30 according to any one of above (1) to (6), the breaker wall surface may have a front breaker wall surface portion 24c that is sandwiched between the pair of protruding portions 12 and is continuous with front edge portion 31. In plan view, a distance D from front breaker wall surface portion 24c to land surface 9 in the direction perpendicular to the direction in which front cutting edge 7 extends may be 0.3 mm or more and 1.5 mm or less. This reduces the curl diameter of a chip, allowing the chip to have a spiral shape. Consequently, damage to the machined wall surface, which is caused by a chip contacting the machined wall surface, can be prevented or reduced.

(8) In cutting insert 30 according to above (7), front breaker wall surface portion 24c may be formed of a plurality of projections 15. This reduces a contact area between a chip and the front breaker wall surface portion, reducing cutting resistance.

(9) In cutting insert 30 according to above (8), in plan view, a height F of each of projections 15 in the direction perpendicular to the direction in which front cutting edge 7 extends may be 0.1 mm or more and 0.5 mm or less. This reduces the curl diameter of a chip, allowing the chip to have a spiral shape. Also, the occurrence of chipping at the tip of the projection can be prevented or reduced.

(10) In cutting insert 30 according to any one of above (1) to (9), land surface 9 may have a pair of lateral land surface portions 9a and 9b each continuous with a corresponding one of a pair of lateral side surfaces 6. In plan view, a spacing A between each of the pair of protruding portions 12a and 12b and a corresponding one of the pair of lateral land surface portions 9a and 9b in the direction perpendicular to the direction in which lateral cutting edge 8 extends is 0.15 mm or more and 0.7 mm or less. The length of a chip can accordingly be reduced.

(11) In cutting insert 30 according to above (10), in plan view, a width C of each of the pair of lateral land surface portions 9a and 9b in the direction perpendicular to the direction in which each of the pair of lateral cutting edges 8a extends may be 10 μm or more and 100 μm or less. The length of a chip can accordingly be reduced. Also, the wear amount of a flank face can be reduced while preventing or reducing the occurrence of chipping at the blade tip.

(12) In cutting insert 30 according to any one of above (1) to (11), land surface 9 may have a front land surface portion 9c continuous with front side surface 5. In plan view, a width J of front land surface portion 9c in the direction perpendicular to the direction in which front cutting edge 7 extends may be 10 μm or more and 100 μm or less. The length of a chip can accordingly be reduced Also, the wear amount of a flank face can be reduced while preventing or reducing the occurrence of chipping at the blade tip.

(13) In cutting insert 30 according to any one of above (1) to (12), an inclination angle θ2 of rake face 11 to land surface 9 may be 15° or more and 45° or less. The length of a chip can accordingly be reduced Also, the wear amount of a flank face can be reduced while preventing or reducing the occurrence of chipping at the blade tip.

(14) In cutting insert 30 according to any one of above (1) above (13), a maximum depth H of chip breaker recess 10 may be 60 μm or more and 200 μm or less. The length of a chip can accordingly be reduced. Also, the wear amount of a flank face can be reduced while preventing or reducing the occurrence of chipping at the blade tip.

(15) In cutting insert 30 according to any one of above (1) to (14), in plan view, a drawing angle θ1 of each of the pair of protruding portions 12 may be 5° or more and 35° or less. This reduces the curl diameter of a chip, allowing the chip to have a spiral shape. Also, a decrease in the quality of a wall surface of a machined groove can be prevented or reduced.

(16) In cutting insert 30 according to any one of above (1) to (15), the breaker wall surface may have a pair of lateral breaker wall surface portions 24a and 24b each facing a corresponding one of the pair of lateral cutting edges. Each of the pair of lateral breaker wall surface portions 24a and 24b may be formed of recesses and protrusions alternately arranged parallel to a corresponding one of the pair of lateral cutting edges. This reduces a contact area between a chip and the lateral breaker wall surface portion, reducing a cutting resistance.

(17) In cutting insert 30 according to above (16), each of the pair of protruding portions 12 has a corresponding one of a pair of straight portions 30a and 30b which is parallel to a corresponding one of the pair of lateral cutting edges 8, and a length B of each of the pair of straight portions 30a and 30b may be 0.15 mm or more and 0.5 mm or less. The wear amount of a flank face can accordingly be reduced while reducing a chip length.

(18) In cutting insert 30 according to above (17), each of the pair of straight portions 30a and 30b is located on the front cutting edge 7 side.

DESCRIPTION OF EMBODIMENTS

Embodiments of the present invention (hereinafter, each of which is referred to as the present embodiment) will now be described in detail with reference to the drawings. It should be noted that in the following drawings, the same or corresponding parts are denoted by the same reference numerals, and the description thereof will not be repeated.

Embodiment 1

First, the structure of a cutting insert 30 according to Embodiment 1 will be described.

As illustrated in FIG. 1, cutting insert 30 according to Embodiment 1 mainly includes a body 1 and an edge portion 2. Edge portion 2 is provided on body 1. Edge portion 2 is provided, for example, on a surface of a projecting portion of body 1. Body 1 has, for example, a fastening hole 20. The material for body 1 is, for example, cemented carbide or steel.

Figure 2:
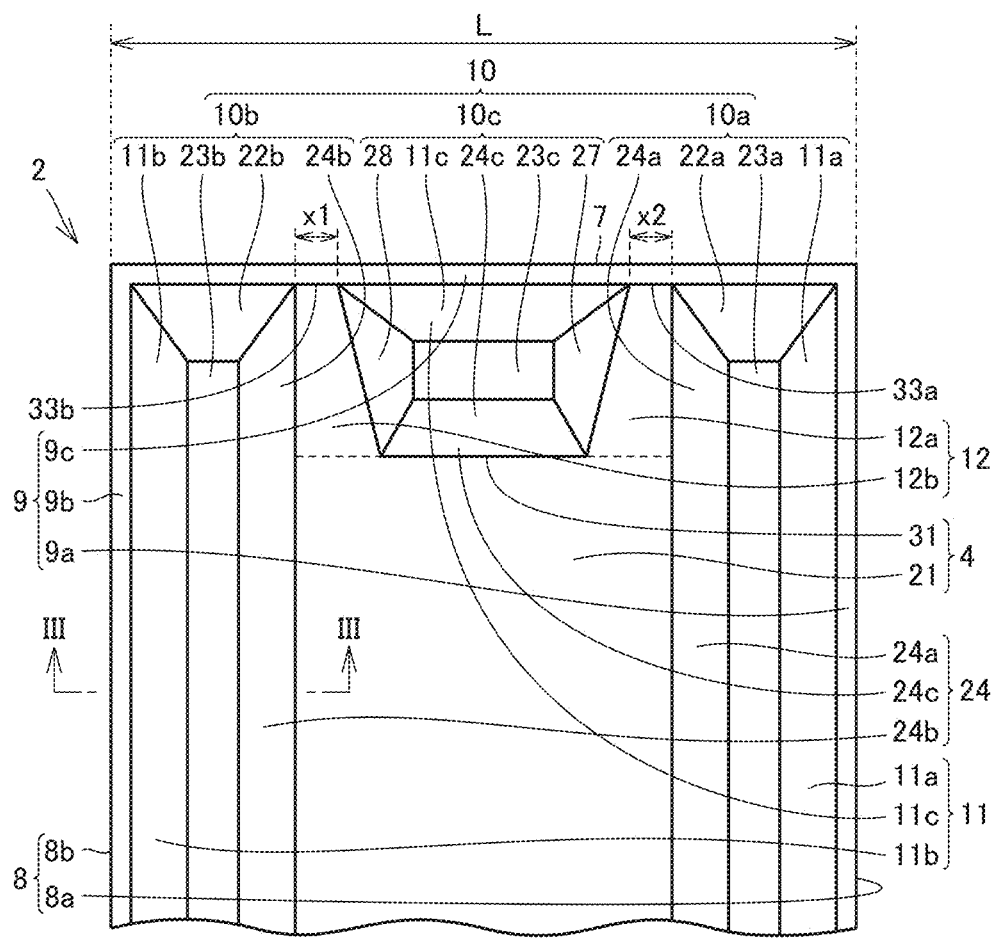
FIG. 2 is a schematic plan view illustrating the structure of an edge portion of the cutting insert according to Embodiment 1.

As illustrated in FIGS. 1 and 2, edge portion 2 includes an upper surface 4, a side surface 32, and a land surface 9. Side surface 32 mainly has a front side surface 5 and a pair of lateral side surfaces 6 adjacent to front side surface 5. Edge portion 2 contains 80 vol % or more of diamond. Edge portion 2 is formed of, for example, a diamond sintered compact. Diamond may be polycrystalline diamond or single crystal diamond. Edge portion 2 preferably contains 90 vol % or more, more preferably, 95 vol % or more of diamond. The load on edge portion 2 is relatively high when cross-feeding is performed with a somewhat great cutting depth. Considering the above, the material for edge portion 2 is preferably polycrystalline diamond that is more resistant to chipping than single crystal diamond. The use of single crystal diamond having an increased strength due to the presence of an additive can also effectively prevent or reduce chipping of edge portion 2.

The surface of edge portion 2 containing diamond has been lapped with a lapping machine. Lapping refers to smoothing performed enough to achieve a mirror plane. Laser machining performed on this surface forms a chip breaker recess 10. Consequently, land surface 9 turns into a lapped surface. The surface roughness of land surface 9 is, for example, 0.05 μm or more and 0.2 μm or less. Herein, the surface roughness refers to ten point height of irregularities (Rz). As a result, welding of aluminum to land surface 9 of edge portion 2 can be prevented or reduced in processing of aluminum. A blade tip (cutting edge) may have been subjected to horning or negative land processing. This increases the strength of the blade tip, which is effective when, for example, chipping is an issue.

An intersection between land surface 9 and front side surface 5 forms front cutting edge 7. An intersection between land surface 9 and each of the pair of lateral side surfaces 6 forms a corresponding one of the pair of lateral cutting edges 8. The pair of lateral side surfaces 6 have a first lateral side surface 6a and a second lateral side surface 6b opposite to first lateral side surface 6a. The pair of lateral cutting edges 8 have a first lateral cutting edge 8a and a second lateral cutting edge 8b opposite to first lateral cutting edge 8a. An intersection between first lateral side surface 6a and land surface 9 forms first lateral cutting edge 8a. Similarly, an intersection between second lateral side surface 6b and land surface 9 forms second lateral cutting edge 8b.

As illustrated in FIG. 2, land surface 9 has a pair of lateral land surface portions (a first lateral land surface portion 9a and a second lateral land surface portion 9b) and a front land surface portion 9c. Each of the pair of lateral land surface portions 9a and 9b is continuous with a corresponding one of the pair of lateral side surfaces 6a and 6b. An intersection between first lateral side surface 6a and first lateral land surface portion 9a forms first lateral cutting edge 8a. An intersection between second lateral side surface 6b and second lateral land surface forms second lateral cutting edge 8b. Front land surface portion 9c is continuous with front side surface 5. An intersection between front side surface 5 and front land surface portion 9c forms front cutting edge 7.

Chip breaker recess 10 is provided between upper surface 4 and land surface 9. Chip breaker recess 10 can be formed by, for example, performing laser processing on edge portion 2. The surfaces forming chip breaker recess 10 include a rake face 11 and a breaker wall surface 24. Rake face 11 is continuous with land surface 9. Breaker wall surface 24 is continuous with upper surface 4. Rake face 11 includes a first lateral rake face portion 11a, a second lateral rake face portion 11b, and a front rake face portion 11c. Breaker wall surface 24 includes a pair of lateral breaker wall surface portions (a first lateral breaker wall surface portion 24a and a second lateral breaker wall surface portion 24b) and a front breaker wall surface portion 24c. Each of the pair of lateral breaker wall surface portions 24a and 24b faces a corresponding one of the pair of lateral cutting edges 8a and 8b.

As illustrated in FIG. 2, chip breaker recess 10 includes a first recess 10a, a second recess 10b, and a third recess 10c. First recess 10a is defined by first lateral rake face portion 11a, a first bottom surface 23a, a first lateral breaker wall surface portion 24a, and a first inclined surface 22a. In other words, the surfaces forming first recess 10a include first lateral rake face portion 11a, first bottom surface 23a, first lateral breaker wall surface portion 24a, and first inclined surface 22a. First lateral rake face portion 11a is continuous with first lateral land surface portion 9a. First lateral breaker wall surface portion 24a is continuous with upper surface 4. First bottom surface 23a connects first lateral breaker wall surface portion 24a and first lateral rake face portion 11a to each other. First inclined surface 22a is continuous with first lateral breaker wall surface portion 24a, first bottom surface 23a, first lateral rake face portion 11a, and front land surface portion 9c.

Second recess 10b is defined by second lateral rake face portion 11b, a second bottom surface 23b, a second lateral breaker wall surface portion 24b, and a second inclined surface 22b. In other words, the surfaces forming second recess 10b include second lateral rake face portion 11b, second bottom surface 23b, second lateral breaker wall surface portion 24b, and second inclined surface 22b. Second lateral rake face portion 11b is continuous with second lateral land surface portion 9b. Second lateral breaker wall surface portion 24b is continuous with upper surface 4. Second bottom surface 23b connects second lateral breaker wall surface portion 24b and second lateral rake face portion 11b to each other. Second inclined surface 22b is continuous with second lateral breaker wall surface portion 24b, second bottom surface 23b, second lateral rake face portion 11b, and front land surface portion 9c.

Figure 3:
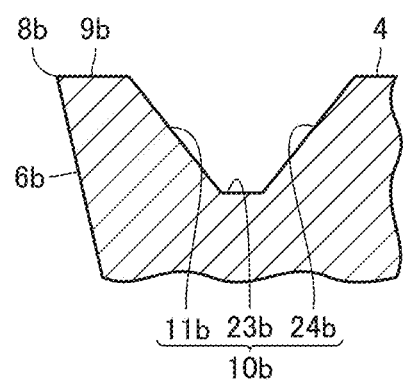
FIG. 3 is a schematic cross-sectional view taken along line in FIG. 2.

As illustrated in FIG. 3, the width of second recess 10b in the direction parallel to the direction in which front cutting edge 7 extends decreases as apart from upper surface 4. Second bottom surface 23b may be substantially parallel to upper surface 4 and second lateral land surface portion 9b. An angle formed between second bottom surface 23b and second lateral breaker wall surface portion 24b may be greater than 90°. Similarly, an angle formed between second bottom surface 23b and second lateral rake face portion 11b may be greater than 90°.

As illustrated in FIG. 2, third recess 10c is defined by front rake face portion 11c, a third bottom surface 23c, front breaker wall surface portion 24c, a third inclined surface 27, and a fourth inclined surface 28. In other words, the surfaces forming third recess 10c include front rake face portion 11c, third bottom surface 23c, front breaker wall surface portion 24c, third inclined surface 27, and fourth inclined surface 28. Front rake face portion 11c is continuous with front land surface portion 9c. Front breaker wall surface portion 24c is continuous with upper surface 4. Third bottom surface 23c connects front breaker wall surface portion 24c and front rake face portion 11c to each other. Third inclined surface 27 and fourth inclined surface 28 are continuous with front breaker wall surface portion 24c, third bottom surface 23c, and front rake face portion 11c. Fourth inclined surface 28 is opposite to third inclined surface 27 from third bottom surface 23c.

Upper surface 4 is a surface opposite to the surface of edge portion 2 which is in contact with body 1. Upper surface 4 is provided between first recess 10a and second recess 10b. In other words, first recess 10a is opposite to second recess 10b from upper surface 4. Upper surface 4 has a front edge portion 31 opposite to front cutting edge 7 from third recess 10c of chip breaker recess 10. Front breaker wall surface portion 24c is sandwiched between the pair of protruding portions 12 and is continuous with front edge portion 31. In other words, front breaker wall surface portion 24c is in contact with upper surface 4 at front edge portion 31. Front edge portion 31 is an intersection between front breaker wall surface portion 24c and upper surface 4.

As illustrated in FIG. 2, the pair of protruding portions 12 are provided to extend from front edge portion 31 toward front cutting edge 7. The pair of protruding portions 12 are part of edge portion 2. The pair of protruding portions 12 include a first protruding portion 12a and a second protruding portion 12b. First protruding portion 12a is located between first recess 10a and third recess 10c. In other words, third recess 10c is opposite to first recess 10a from first protruding portion 12a. Second protruding portion 12b is located between second recess 10b and third recess 10c. In other words, third recess 10c is opposite to second recess 10b from second protruding portion 12b. Third recess 10c is located between first protruding portion 12a and second protruding portion 12b. A spacing between the pair of protruding portions 12 may decrease as apart from front cutting edge 7.

Third inclined surface 27 and part of first lateral breaker wall surface portion 24a form first protruding portion 12a. First protruding portion 12a applies a stress to a chip cut with first lateral cutting edge 8a by first lateral breaker wall surface portion 24a, thereby dividing the chip. First protruding portion 12a changes the direction in which a chip advances such that a chip cut with front cutting edge 7 by third inclined surface 27 heads for front breaker wall surface portion 24c. Similarly, fourth inclined surface 28 and part of second lateral breaker wall surface portion 24b form second protruding portion 12b. Second protruding portion 12b applies a stress to a chip cut with second lateral cutting edge 8b by second lateral breaker wall surface portion 24b, thereby dividing the chip. Second protruding portion 12b changes the direction in which a chip advances such that a chip cut with front cutting edge 7 by fourth inclined surface 28 heads for front breaker wall surface portion 24c.

As illustrated in FIG. 2, each of the pair of protruding portions 12 may be continuous with land surface 9. Specifically, each of first protruding portion 12a and second protruding portion 12b connects front land surface portion 9c and upper surface 4 to each other. The upper end surface of first protruding portion 12a is continuous with both of front land surface portion 9c and upper surface 4. Similarly, the upper end surface of second protruding portion 12b is continuous with both of front land surface portion 9c and upper surface 4.

A value obtained by dividing a sum G of a length X1 of a boundary 33b between second protruding portion 12b, which is one of the pair of protruding portions 12, and front land surface portion 9c and a length X2 of a boundary 33a between first protruding portion 12a, which is the other of the pair of protruding portions 12, and front land surface portion 9c by a length L of front cutting edge 7 is, for example, 0.1 or less. A value obtained by dividing sum G of length X1 and length X2 by length L of front cutting edge 7 may be 0.05 or less or 0.02 or less. In plan view (as seen from a direction perpendicular to upper surface 4), the width of each of the pair of protruding portions 12 in the direction parallel to the direction in which front cutting edge 7 extends may increase as apart from front land surface portion 9c.

Embodiment 2

The structure of a cutting insert according to Embodiment 2 will now be described. The structure of the cutting insert according to Embodiment 2 differs from the structure of the cutting insert according to Embodiment 1 in that each of a pair of protruding portions is apart from a land surface, and is substantially similar to the structure of the cutting insert according to Embodiment 1 in other respects.

Figure 4:
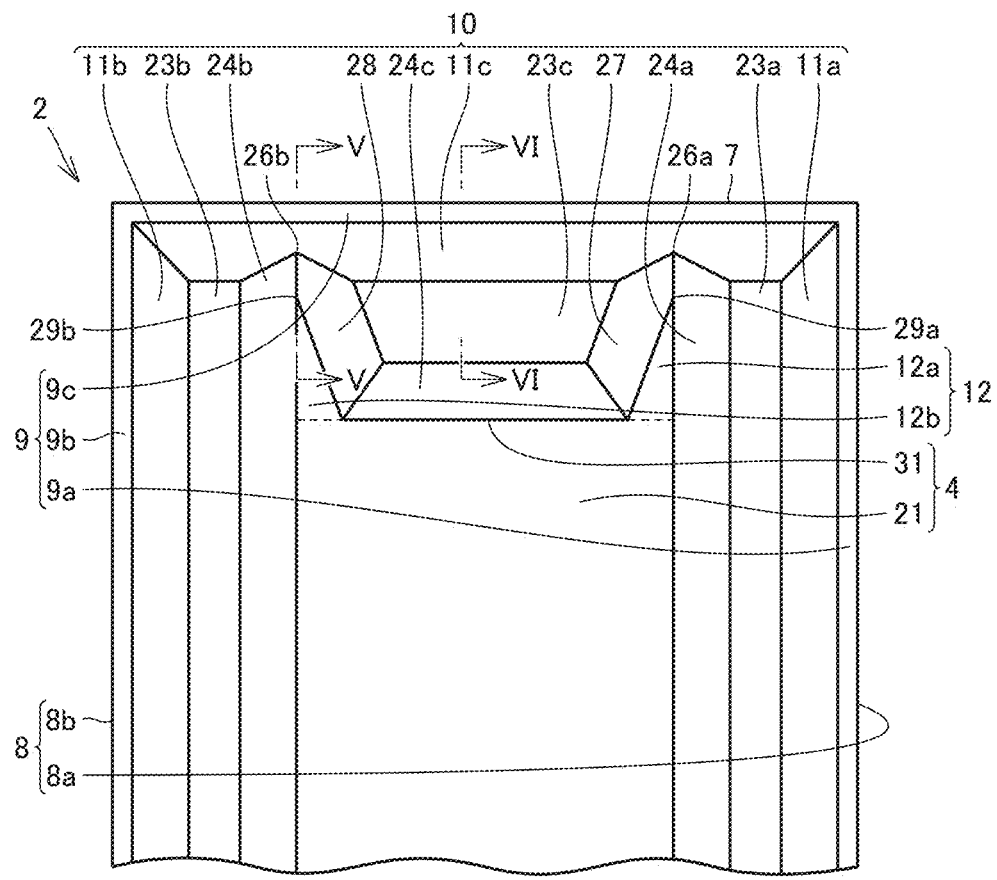
FIG. 4 is a schematic plan view showing the structure of an edge portion of a cutting insert according to Embodiment 2.

As illustrated in FIG. 4, each of the pair of protruding portions 12 of cutting insert 30 according to Embodiment 2 may be apart from land surface 9. First protruding portion 12a and second protruding portion 12b are separated from front land surface portion 9c by recess 10. Third inclined surface 27 and part of first lateral breaker wall surface portion 24a form first protruding portion 12a. A tip 26a of first protruding portion 12a is an intersection of third inclined surface 27, first lateral breaker wall surface portion 24a, and front rake face portion 11c. Similarly, fourth inclined surface 28 and part of second lateral breaker wall surface portion 24b form second protruding portion 12b. A tip 26b of second protruding portion 12b is an intersection of fourth inclined surface 28, second lateral breaker wall surface portion 24b, and front rake face portion 11c. In the direction perpendicular to upper surface 4, tip 26a of first protruding portion 12a and tip 26b of second protruding portion 12b are located lower than upper surface 4.

Figure 5:
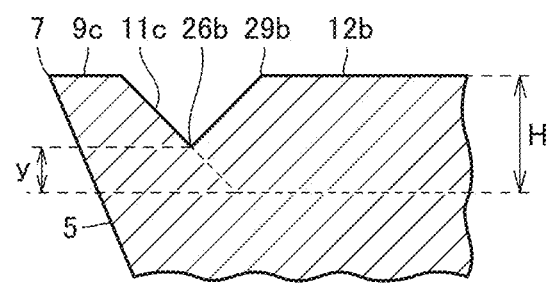
FIG. 5 is a schematic cross-sectional view taken along line V-V in FIG. 4.
Figure 6:
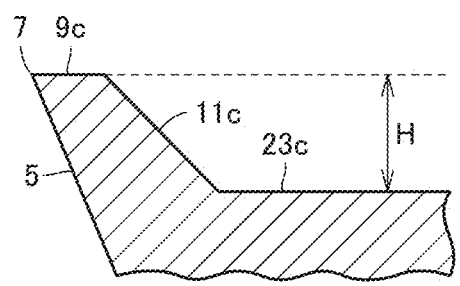
FIG. 6 is a schematic cross-sectional view taken along line VI-VI in FIG. 4.

FIG. 5 illustrates a cross-section that passes through tip 26b of second protruding portion 12b and is perpendicular to the direction in which front cutting edge 7 extends. FIG. 6 illustrates a cross-section that passes through an intermediate position between tip 26a of first protruding portion 12a and tip 26b of second protruding portion 12b and is perpendicular to the direction in which front cutting edge 7 extends. As illustrated in FIGS. 5 and 6, a value obtained by dividing a height y from the lowest position of second protruding portion 12b to the deepest portion 23c of chip breaker recess 10 by a depth H of chip breaker recess 10 at the deepest portion 23c is, for example, 0.3 or more and less than 1.0. A value obtained by dividing height y by depth H may be 0.5 or more and less than 1.0. It should be noted that the lowest position of protruding portion 12 does not need to be tip 26a, 26b of protruding portion 12. The lowest position of protruding portion 12 may be located between tip 26a, 26b of protruding portion 12 and an upper end 29a, 29b of protruding portion 12 (see FIG. 4). It should be noted that upper end 29a, 29b of protruding portion 12 is a tip of the upper surface portion of protruding portion 12 extending along upper surface 4.

Embodiment 3

The structure of a cutting insert according to Embodiment 3 will now be described. The structure of the cutting insert according to Embodiment 3 differs from the structure of the cutting insert according to Embodiment 1 mainly in that the front breaker wall surface portion is formed of a plurality of projections and each of the pair of lateral breaker wall surface portions is formed of recesses and protrusions alternately arranged parallel to a corresponding one of the pair of lateral cutting edges, and is substantially similar to the structure of the cutting insert according to Embodiment 1 in other respects.

Figure 7:
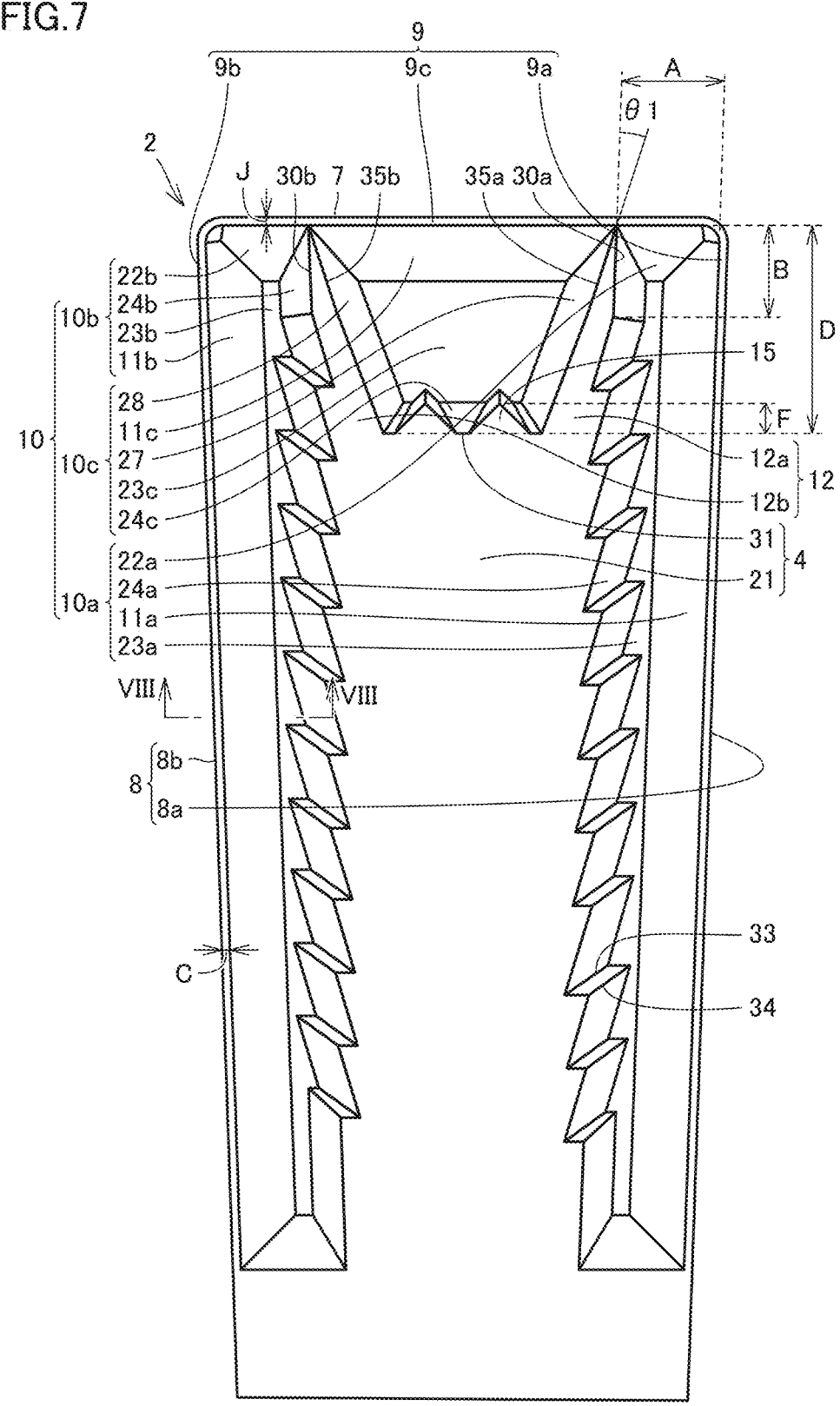
FIG. 7 is a schematic plan view illustrating the structure of an edge portion of a cutting insert according to Embodiment 3.

As illustrated in FIG. 7, front breaker wall surface portion 24c of cutting insert 30 according to Embodiment 3 is formed of a plurality of projections 15. Each of projections 15 projects, for example, from upper surface 4 toward front cutting edge 7. The width of each of projections 15 in the direction in which front cutting edge 7 extends decreases as closer to front cutting edge 7. The number of projections 15 is, for example, two, and may be three or more.

In plan view, a height F of each of projections 15 in a direction perpendicular to the direction in which front cutting edge 7 extends is, for example, 0.1 mm or more and 0.5 mm or less. Although an upper limit of height F of each of projections 15 is not particularly limited, it may be, for example, 0.35 mm. Although a lower limit of height F of each of projections 15 is not particularly limited, it may be, for example, 0.15 mm. Height F of projection 15 is, for example, a distance from the tip of the upper end surface of projection 15 to a boundary of front edge portion 31.

As illustrated in FIG. 7, each of a pair of lateral breaker wall surface portions 24a and 24b may be formed of recesses 33 and protrusions 34 alternately arranged parallel to a corresponding one of the pair of lateral cutting edges 8a and 8b. It should be noted that the direction in which recesses 33 and protrusions 34 are arranged alternately may not be parallel to the direction in which lateral cutting edges 8a and 8b extend and may be shifted a little from the parallel state, as long as similar effects can be achieved. Recesses 33 and protrusions 34 may be pointed or rounded. The shapes of recess 33 and protrusion 34 may be triangular or rectangular in plan view.

In plan view, a distance D from front breaker wall surface portion 24c to front land surface portion 9c in the direction perpendicular to the direction in which front cutting edge 7 extends may be, for example, 0.3 mm or more and 1.5 mm or less. Although an upper limit of distance D is not particularly limited, it may be, for example, 1.1 mm. Although a lower limit of distance D is not particularly limited, it may be, for example, 0.7 mm. Distance D is, for example, a distance from front edge portion 31, which is a boundary between front breaker wall surface portion 24c and upper surface 4, to a boundary between front land surface portion 9c and front rake face 11c.

Each of the pair of protruding portions 12 has a corresponding one of a pair of straight portions 30a and 30b parallel to a corresponding one of the pair of lateral cutting edges 8a and 8b. Specifically, first protruding portion 12a has first straight portion 30a parallel to first lateral cutting edge 8a. Similarly, second protruding portion 12b has second straight portion 30b parallel to second lateral cutting edge 8b. Each of the pair of straight portions 30a and 30b is located on the front cutting edge 7 side. A length B of each of the pair of straight portions (first straight portion 30a and second straight portion 30b) is, for example, 0.15 mm or more and 0.5 mm or less. Although an upper limit of length B is not particularly limited, it may be, for example, 0.40 mm. Although a lower limit of length B is not particularly limited, it may be, for example, 0.25 mm. It should be noted that the direction in which the pair of straight portions 30a and 30b extend may not be parallel to the direction in which the pair of lateral cutting edges 8a and 8b extend and may be shifted a little from the parallel state, as long as similar effects can be achieved.

In plan view, a spacing A between each of the pair of protruding portions 12a and 12b and a corresponding one of the pair of lateral land surface portions 9a and 9b in the direction perpendicular to the direction in which a corresponding one of the pair of lateral cutting edges 8 extends is, for example, 0.15 mm or more and 0.7 mm or less. Specifically, spacing A is a spacing between straight portion 30a of first protruding portion 12a and a boundary between first lateral land surface portion 9a and first rake face portion 11a. Similarly, spacing A is a spacing between straight portion 30b of second protruding portion 12b and a boundary between second lateral land surface portion 9b and second rake face portion 11b. Although an upper limit of spacing A is not particularly limited, it may be, for example, 0.50 mm. Although a lower limit of spacing A is not limited, it may be, for example, 0.20 mm.

In plan view, a width C of each of the pair of lateral land surface portions 9a and 9b in the direction perpendicular to the direction in which a corresponding one of the pair of lateral cutting edges 8a and 8b extends is, for example, 10

μm or more and 100 μm or less. Specifically, width C is a width of first lateral land surface portion 9a in the direction perpendicular to the direction in which first lateral cutting edge 8a extends. Similarly, width C is a width of second lateral land surface portion 9b in the direction perpendicular to the direction in which second lateral cutting edge 8b extends. Although an upper limit of width C is not particularly limited, it may be, for example, 50 μm. Although a lower limit of width C is not particularly limited, it may be, for example, 20 μm. In plan view, a width J of front land surface portion 9c in the direction perpendicular to the direction in which front cutting edge 7 extends is, for example, 10 μm or more and 100 μm or less. Although an upper limit of width J is not particularly limited, it may be, for example, 50 μm. Although a lower limit of width J is not particularly limited, it may be, for example, 20 μm.

In plan view, a drawing angle θ1 of each of the pair of protruding portions 12 (first protruding portion 12a and second protruding portion 12b) may be 5° or more and 35° or less. The upper surface of first protruding portion 12a has a first straight portion 30a and a first inclined portion 35a opposite to first straight portion 30a. First inclined portion 35a is continuous with third inclined surface 27. Similarly, the upper surface of second protruding portion 12b has a second straight portion 30b and a second inclined portion 35b opposite to second straight portion 30b. Second inclined portion 35b is continuous with fourth inclined surface 28. A drawing angle θ is an angle formed between first straight portion 30a and first inclined portion 35a. Similarly, drawing angle θ is an angle formed between second straight portion 30b and second inclined portion 35b. Although an upper limit of drawing angle θ1 is not particularly limited, it may be, for example, 25°. Although a lower limit of drawing angle θ is not particularly limited, it may be, for example, 15°.

Figure 8:
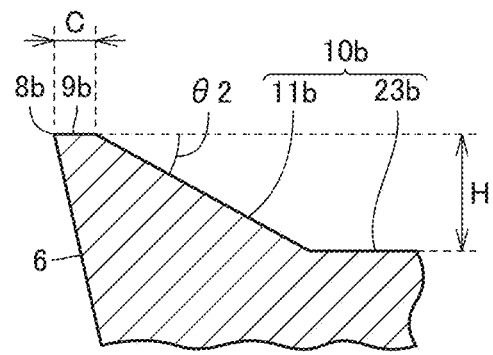
FIG. 8 is a schematic cross-sectional view taken along line VIII-VIII in FIG. 7.

As illustrated in FIG. 8, an inclination angle θ2 of rake face 11 to land surface 9 is 15° or more and 45° or less. Specifically, inclination angle θ2 is an inclination angle of second lateral rake face portion 11b to second lateral land surface portion 9b. Although an upper limit of inclination angle θ2 is not particularly limited, it may be, for example, 35°. Although a lower limit of inclination angle θ2 is not particularly limited, it may be, for example, 20°. An inclination angle of second lateral rake face portion 11b to second lateral land surface portion 9b may be substantially equal to an inclination angle of first lateral rake face portion 11a to first lateral land surface portion 9a and an inclination angle of front rake face portion 11a to front land surface portion 9c.

As illustrated in FIG. 8, maximum depth H of chip breaker recess 10 is, for example, 60 μm or more and 200 μm or less. Maximum depth H of chip breaker recess 10 is, for example, a distance between second bottom surface 23b and second lateral land surface portion 9b in the direction perpendicular to upper surface 4. Although an upper limit of maximum depth H is not particularly limited, it may be, for example, 150 μm. Although a lower limit of maximum depth H is not particularly limited, it may be, for example, 100 μm.

Functions and effects of the cutting insert according to the present embodiment will now be described.

In cutting insert 30 according to the present embodiment, the pair of protruding portions 12 are provided to extend from front edge portion 31 toward front cutting edge 7. A portion of chip breaker recess 10 located between the pair of protruding portions 12 allows a chip to be divided into short pieces in grooving. Also, a portion of chip breaker recess 10 located between each of the pair of protruding portions 12 and a corresponding one of the pair of lateral side surfaces 6 allows a chip to be divided into short pieces in cross-feeding. Consequently, a chip can be divided into short pieces when grooving and cross-feeding are performed on, for example, a workpiece having high toughness, such as aluminum alloy. A decrease in machining accuracy, which is caused when a workpiece is cut with a chip twisted therearound, can thus be minimized. Also, the interruption of cutting due to a chip twisted around the workpiece can be prevented or reduced. As a result, cutting can be automated.

In cutting insert 30 according to the present embodiment, each of the pair of protruding portions 12 is continuous with land surface 9. When the protruding portion and the land surface are continuous with each other, a ratio of a lapped surface is higher than when the protruding portion and the land surface are apart from each other. Thus, welding of the blade tip can be reduced effectively during grooving. Welding of the blade tip can be effectively reduced especially when a material having high toughness among aluminums and aluminum alloys is used.

Further, in cutting insert 30 according to the present embodiment, a value (G/L ratio) obtained by dividing sum G of length X1 of boundary 33b between protruding portion 12b, which is one of the pair of protruding portions 12, and land surface 9 and length X2 of boundary 33a between protruding portion 12a, which is the other of the pair of protruding portions 12, and land surface 9 by length L of front cutting edge 7 may be 0.1 or less. This reduces a curl diameter of a chip, allowing the chip to have a spiral shape. Consequently, damage to the machined wall surface, which is caused by a chip contacting the machined wall surface, can be prevented or reduced.

Further, in cutting insert 30 according to the present embodiment, each of the pair of protruding portions 12 is apart from land surface 9. When the protruding portion and the land surface are apart from each other, a cutting fluid can be supplied to the blade tip more efficiently than when the protruding portion and the land surface are continuous with each other. A lubricating effect of the blade tip can thus be obtained efficiently. Consequently, especially when a material containing a hard substance such as silicon (Si) among aluminums and aluminum alloys is cut, the lubricating effect of the blade tip can be obtained efficiently.

Further, in cutting insert 30 according to the present embodiment, in a cross-section that passes through tip 29b of each of the pair of protruding portions 12 and is perpendicular to the direction in which front cutting edge 7 extends, a value obtained by dividing height y from the lowest position 26b of each of the pair of protruding portions to the deepest portion 23c of chip breaker recess 10 by depth H of chip breaker recess 10 at the deepest portion 23c is 0.3 or more and less than 1.0. This can reduce a chip length.

Further, in cutting insert 30 according to the present embodiment, a spacing between the pair of protruding portions 12 may decrease as apart from front cutting edge 7.

Further, in cutting insert 30 according to the present embodiment, the breaker wall surface may be sandwiched between the pair of protruding portions 12 and have front breaker wall surface portion 24c continuous with front edge portion 31. In plan view, distance D from front breaker wall surface portion 24c to land surface 9 in the direction perpendicular to the direction in which front cutting edge 7 extends may be 0.3 mm or more and 1.5 mm or less. This reduces the curl diameter of a chip, allowing the chip to have a spiral shape. Consequently, damage to the machined wall surface, which is caused by a chip contacting the machined wall surface, can be prevented or reduced.

Further, in cutting insert 30 according to the present embodiment, front breaker wall surface portion 24c may be formed of projections 15. This reduces a contact area between the chip and the front breaker wall surface portion, reducing cutting resistance.

Further, in cutting insert 30 according to the present embodiment, in plan view, height F of each of projections 15 in the direction perpendicular to the direction in which front cutting edge 7 extends may be 0.1 mm or more and 0.5 mm or less. This reduces the curl diameter of a chip, allowing the chip to have a spiral shape. Also, the occurrence of chipping at the tip of the projection can be prevented or reduced.

Further, in cutting insert 30 according to the present embodiment, land surface 9 may have the pair of lateral land surface portions 9a and 9b each continuous with a corresponding one of the pair of lateral side surfaces 6. In plan view, spacing A between each of the pair of protruding portions 12a and 12b and a corresponding one of the pair of lateral land surface portions 9a and 9b in the direction perpendicular to the direction in which lateral cutting edge 8 extends is 0.15 mm or more and 0.7 mm or less. The length of a chip can accordingly be reduced.

Further, in cutting insert 30 according the present embodiment, in plan view, width C of each of the pair of lateral land surface portions 9a and 9b in the direction perpendicular to the direction in which a corresponding one of the pair of lateral cutting edges 8a and 8b extends may be 10 μm or more and 100 μm or less. The length of a chip can accordingly be reduced. Also, the wear amount of a flank face can be reduced while preventing or reducing the occurrence of chipping at the blade tip.

Further, in cutting insert 30 according to the present embodiment, land surface 9 may have front land surface portion 9c a continuous with front side surface 5. In plan view, width J of front land surface portion 9c in the direction perpendicular to the direction in which front cutting edge 7 extends may be 10 μm or more and 100 μm or less. This reduces a chip length. Also, a wear amount of a flank surface can be reduced while preventing or reducing the occurrence of chipping at the blade tip.

Further, in cutting insert 30 according to the present embodiment, inclination angle θ2 of rake face 11 to land surface 9 may be 15° or more and 45° or less. The length of a chip can accordingly be reduced. Also, the wear amount of a flank face can be reduced while preventing or reducing the occurrence of chipping at the blade tip.

Further, in cutting insert 30 according to the present embodiment, maximum depth H of chip breaker recess 10 may be 60 μm or more and 200 μm or less. The length of a chip can accordingly be reduced. Also, the wear amount of a flank face can be reduced while preventing or reducing the occurrence of chipping at the blade tip.

Further, in cutting insert 30 according to the present embodiment, in plan view, drawing angle θ1 of each of the pair of protruding portions 12 may be 5° or more and 35° or less. This reduces the curl diameter of a chip, allowing the chip to have a spiral shape. Also, a decrease in the quality of a wall surface of a machined groove can be prevented or reduced.

Further, in cutting insert 30 according to the present embodiment, the breaker wall surface may have the pair of lateral breaker wall surface portions 24a and 24b each facing a corresponding one of the pair of lateral cutting edges. Each of the pair of lateral breaker wall surface portions 24a and 24b may be formed of recesses and protrusions alternately arranged parallel to a corresponding one of the pair of lateral cutting edges. This reduces a contact area between a chip and a lateral breaker wall surface portion, reducing a cutting resistance.

Further, in cutting insert 30 according to the present embodiment, each of the pair of protruding portions 12 has a corresponding one of the pair of straight portions 30a and 30b which is parallel to a corresponding one of the pair of lateral cutting edges 8, and length B of each of the pair of straight portions 30a and 30b may be 0.15 mm or more and 0.5 mm or less. The wear amount of a flank face can accordingly be reduced while reducing a chip length.

EXAMPLES

Example 1

In this example, effects of a value (G/L ratio) on the curl diameter of a chip and the state of the chip were examined, where the value is obtained by dividing sum G of length X1 of boundary 33b between second protruding portion 12b and front land surface portion 9c and length X2 of boundary 33a between first protruding portion 12a and front land surface portion 9c by length L of front cutting edge 7. First, cutting inserts with sample numbers 1A to 1D were prepared. The G/L ratios of the cutting inserts with sample numbers 1A to 1D are 0.02, 0.05, 0.10, and 0.15, respectively.

Figure 9:
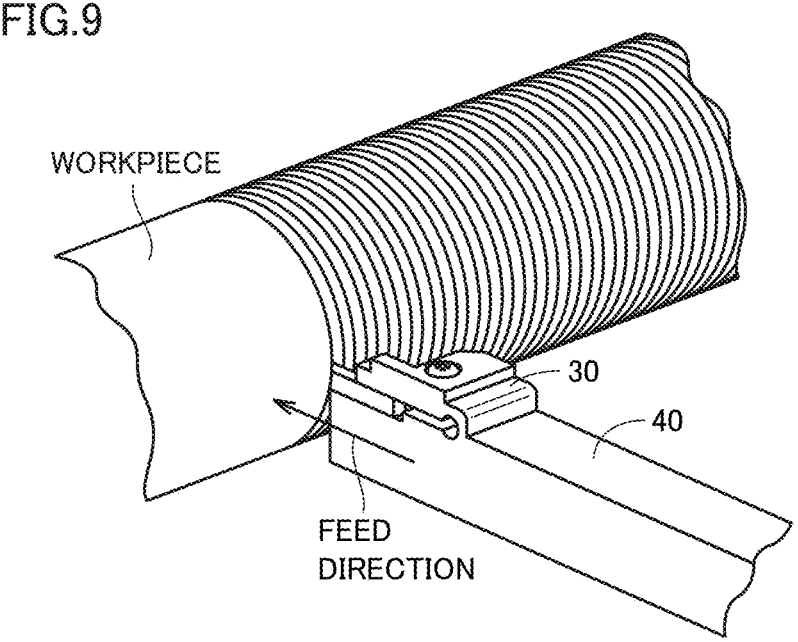
FIG. 9 is a schematic perspective view illustrating how to groove a workpiece.
Figure 10:
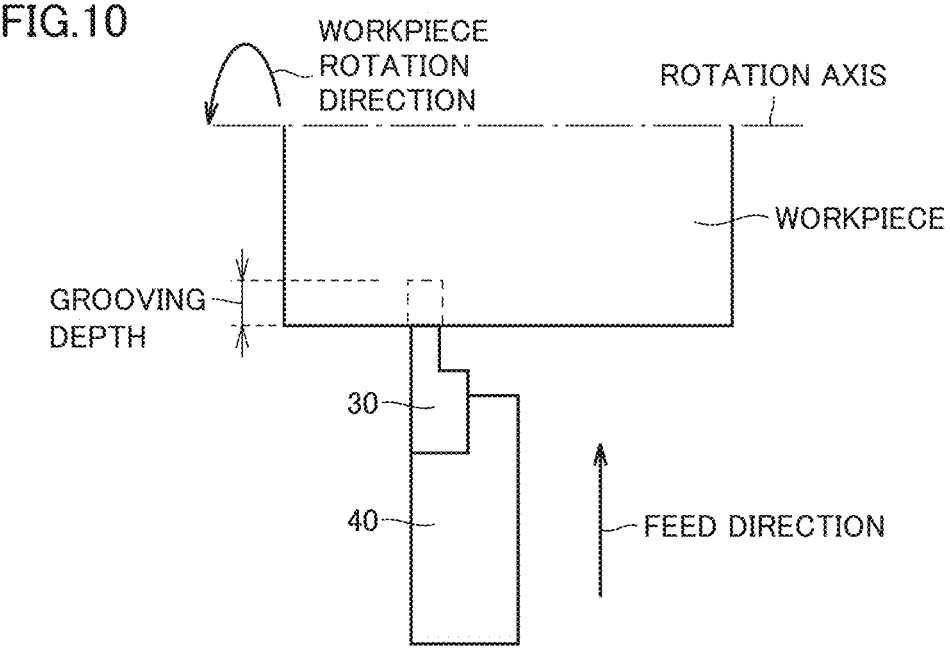
FIG. 10 is a schematic plan view illustrating how to groove a workpiece.

As illustrated in FIGS. 9 and 10, a workpiece was grooved with cutting insert 30. Cutting insert 30 is fixed to a holding member 40. The feed direction of cutting insert 30 is a direction perpendicular to the rotation axis of a workpiece.

<Cutting Conditions>

A workpiece was an aluminum alloy A6061 having a cylindrical shape. The size of the workpiece was a diameter of 30 mm by a length of 60 mm. A cutting method was grooving. A cutting manner was wet cutting. A cutting distance was 200 m. The peripheral surface speed of a workpiece was 180 m/min. Grooving was performed for the entire groove width. A tool grooving depth was 8 mm in diameter. A tool feed speed was 0.07 mm/rev.

<Tool Shape>

The tool was a polycrystalline diamond (PCD) multi-function tool having a groove width of 2 mm by a lateral cutting edge length of 4.5 mm. PCD refers to sintered polycrystalline diamond obtained by sintering diamond particles at high temperature and high pressure. The multi-function tool refers to a tool that can be used for both of grooving and cross-feeding. The material for the tool was a polycrystalline hard sintered compact containing 90 vol % of diamond having an average particle size of 0.5 μm. The holder model number was SGWR1212. A width (C) of the land surface was 0.03 mm. A maximum depth (H) of a recess was 100 μm. A distance (A) was 0.2 mm. A distance (D) was 0.5 mm. A projection height (F) was 0.15 mm. An inclination angle (θ2) of the rake face was 25°. A drawing angle (θ1) was 10°.

TABLE 1

| Sample No. | Total length (G)/length (L) of front cutting edge | Length (X1) of boundary (mm) | Length (X2) of boundary (mm) | Curl diameter of chip (mm) (chip state) |
| --- | --- | --- | --- | --- |
| 1A | 0.02 | 0.02 | 0.02 | less than 10 (spiral) |
| 1B | 0.05 | 0.05 | 0.05 | less than 10 (spiral) |
| 1C | 0.10 | 0.1 | 0.1 | less than 10 (spiral) |
| 1D | 0.15 | 0.15 | 0.15 | 30 to 50 (irregular) |

Figure 11:
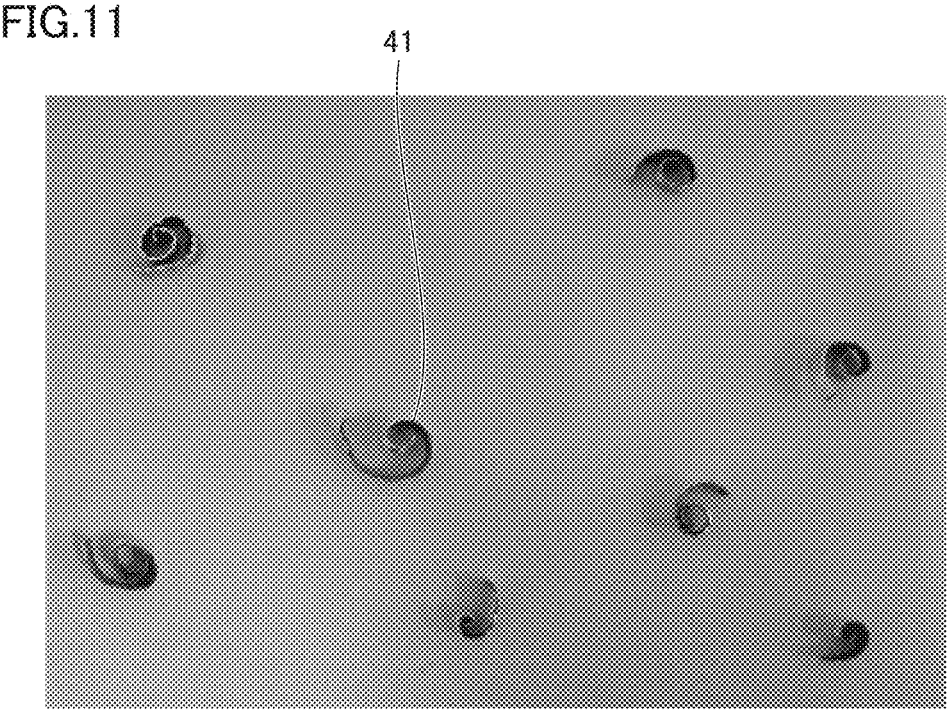
FIG. 11 shows a spiral chip.
Figure 12:
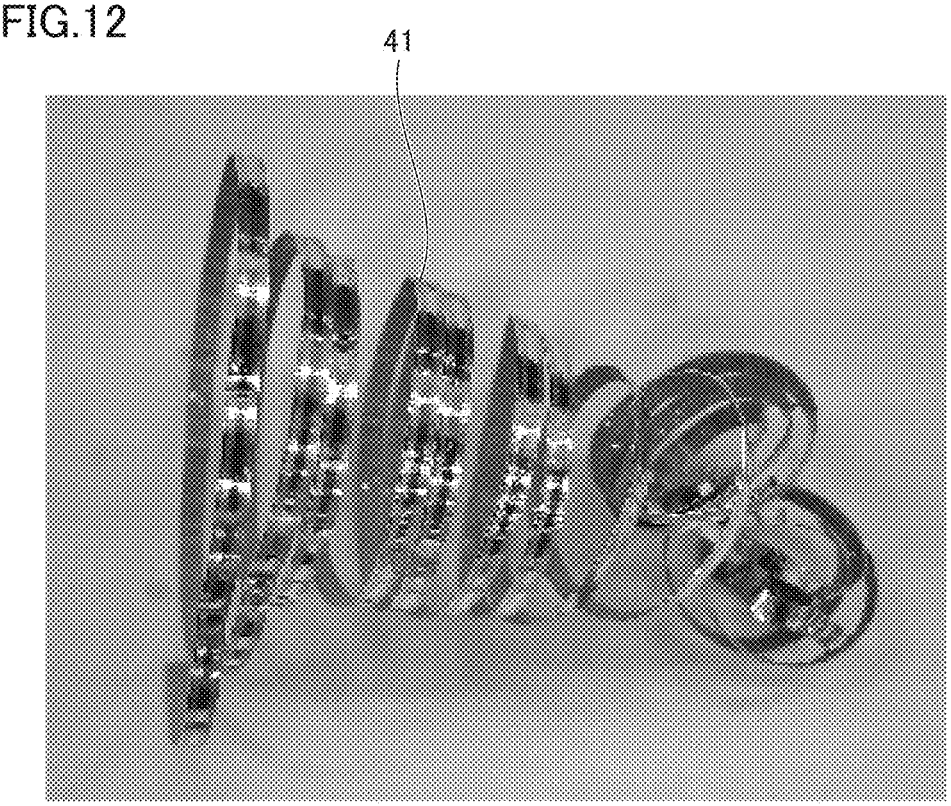
FIG. 12 shows a first example of an irregular chip.
Figure 13:
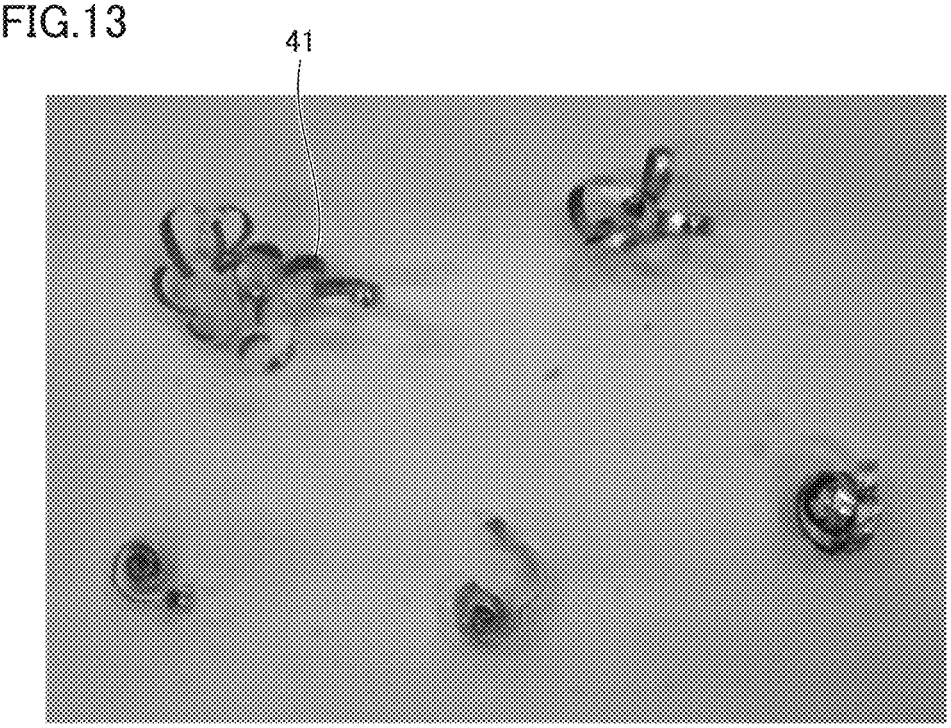
FIG. 13 shows a second example of an irregular chip.

As shown in Table 1, when the cutting inserts with sample numbers 1A to 1C were used, the curl diameter of a chip was 10 mm or less, and the chip state was spiral. As illustrated in FIG. 11, a spiral chip gradually becomes larger from a state with a very small curl diameter and is divided at some midpoint thereof. In contrast, when the cutting insert with sample number 1D was used, the curl diameter of a chip was 30 to 50 mm, and the chip state was irregular. As illustrated in FIG. 12, for example, a certain irregular chip has a large curl diameter, and accordingly, is highly likely to wind around a workpiece. As illustrated in FIG. 13, for example, another irregular chip fails to curl up neatly and looks clogged, and is highly likely to wind around a workpiece. When the cutting insert with sample number 1D was used, for example, an irregular chip as illustrated in FIG. 13 was obtained, though the chip was divided. The above results confirmed that setting the G/L ratio of a cutting insert to 0.10 or less can reduce the curl diameter of a chip, allowing the chip to have a spiral shape.

Example 2

In this example, an effect of a value (y/H ratio) on a chip length was examined, where the value is obtained by dividing height y from the lowest position 26b of each of the pair of protruding portions to the deepest portion 23c of chip breaker recess 10 by depth H of chip breaker recess 10 at the deepest portion 23c. First, cutting inserts with sample numbers 2A to 2D were prepared. The y/H ratios of the cutting inserts with sample numbers 2A to 2D are 0.1, 0.3, 0.5, and 0.7, respectively.

Figure 14:
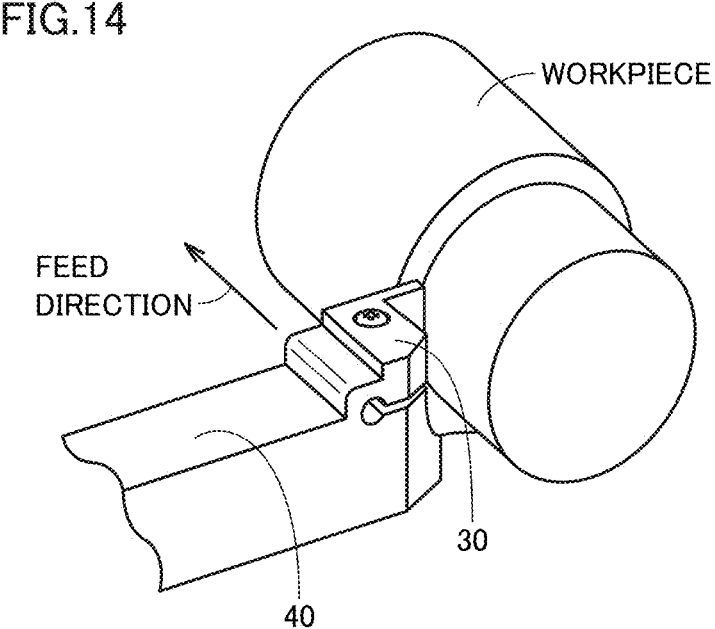
FIG. 14 is a schematic perspective view illustrating how to cross-feed a workpiece.
Figure 15:
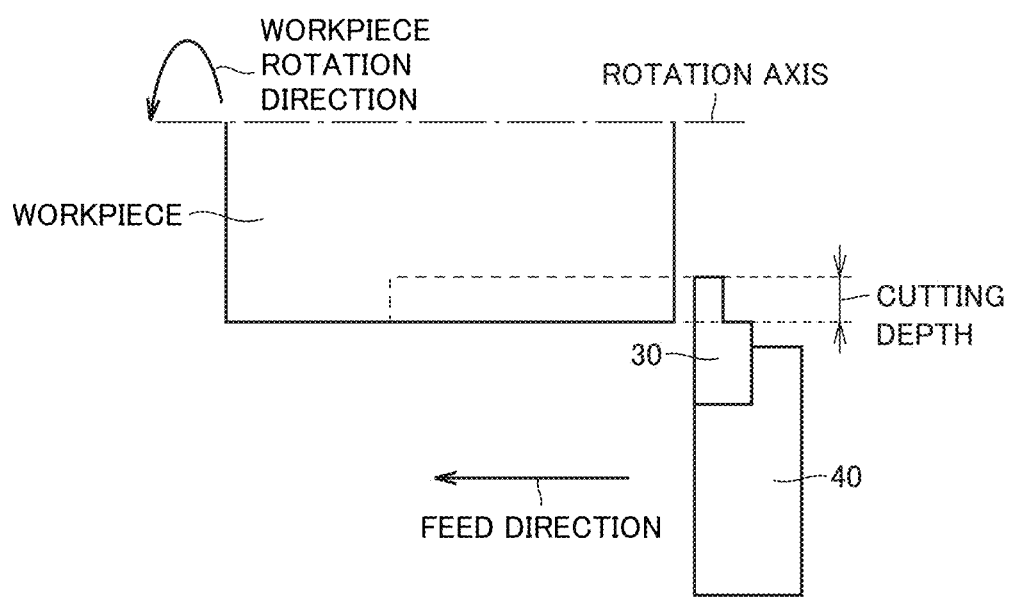
FIG. 15 is a schematic plan view illustrating how to cross-feed a workpiece.

As illustrated in FIGS. 14 and 15, outside-diameter cross-feeding was performed on a workpiece with cutting insert 30. The feed direction of cutting insert 30 is a direction parallel to the rotation axis of a workpiece.

<Cutting Conditions>

A workpiece was an aluminum alloy A6061 having a cylindrical shape. The size of the workpiece was a diameter of 10 mm by a length of 40 mm. A cutting method was outside-diameter cross-feeding. A cutting manner was wet cutting. A cutting distance was 200 m. The peripheral surface speed of a workpiece was 250 m/min. A tool cutting depth was 0.15 mm. A tool feed speed was 0.07 mm/rev.

<Tool Shape>

The tool was a PCD multi-function tool having a groove width of 2 mm by a lateral cutting edge length of 4.5 mm. The material for the tool was a polycrystalline hard sintered compact containing 90 vol % of diamond having an average particle size of 0.5 μm. The holder model number was SGWR1212. A width (C) of the land surface was 0.03 mm. A distance (A) was 0.4 mm. A distance (D) was 0.85 mm. A projection height (F) was 0.15 mm. An inclination angle (θ2) of the rake face was 25°. A drawing angle (θ1) was 15°.

TABLE 2

| Sample No. | Height (y)/depth (H) | Height (y) (μm) | Depth (H) (μm) | Chip length (mm) |
|---|---|---|---|---|
| 2A | 0.1 | 10 | 100 | 250 to 350 |
| 2B | 0.3 | 30 | 100 | 50 to 120 |
| 2C | 0.5 | 50 | 100 | 30 to 80 |
| 2D | 0.7 | 70 | 100 | 30 to 80 |

As shown in Table 2, when the cutting insert with sample number 2B was used, the chip length was 50 to 120 mm or less. When the cutting inserts with sample numbers 2C and 2D were used, the chip length was 30 to 80 mm or less. In contrast, when the cutting insert with sample number 2A was used, the chip length was 250 to 350 mm or less. It is considered that a y/H ratio smaller than 0.3 fails to provide a chip with a distortion large enough to divide the chip, resulting in a longer chip. The above results confirmed that setting the y/H ratio of a cutting insert to 0.3 or more can effectively reduce a chip length.

Example 3

In this example, effects of a length (B) of a straight portion of a protruding portion on a chip length and a flank face wear amount were examined. First, cutting inserts with sample numbers 3A to 3E were prepared. The lengths (B) of the straight portions of the cutting inserts with sample numbers 3A to 3E are 0.05, 0.15, 0.35, 0.50, and 0.60, respectively.

Figure 16:
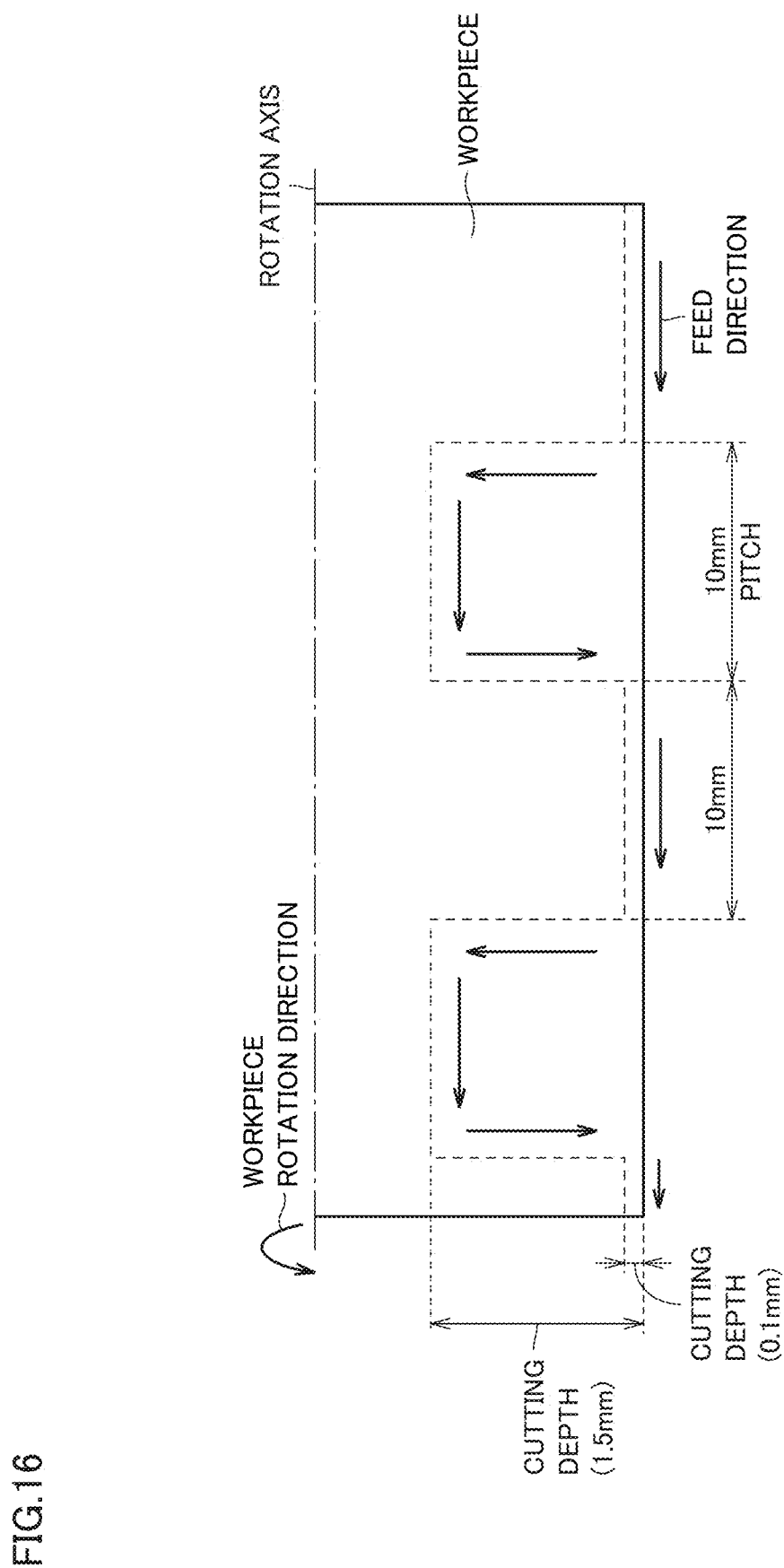
FIG. 16 is a schematic plan view illustrating an example of tooling of cross-feed.

As illustrated in FIG. 16, outside-diameter cross-feeding was performed on a workpiece with cutting insert 30. As illustrated in FIG. 16, cutting insert 30 was fed parallel to the rotation axis of a workpiece, and is subsequently fed perpendicular to the rotation axis of the workpiece. Such feeding was repeated.

<Cutting Conditions>

A workpiece was an aluminum alloy A6061 having a cylindrical shape. The size of the workpiece was a diameter of 10 mm by a length of 3000 mm. A cutting method was outside-diameter cross-feeding. A cutting manner was wet cutting. A cutting distance was 1,000 m. The peripheral surface speed of a workpiece was 250 m/min. Tool cutting depths were 0.1 mm and 1.5 mm. Grooves having a small cutting depth (0.1 mm) and grooves having a great cutting depth (1.5 mm) were processed alternately. The pitch of each of the grooves with a small cutting depth and the grooves with a great cutting depth was 10 mm. A tool feed speed was 0.07 mm/rev.

<Tool Shape>

The tool was a PCD multi-function tool having a groove width of 2 mm by a lateral cutting edge length of 4.5 mm. The material for the tool was a polycrystalline hard sintered compact containing 90 vol % of diamond having an average particle size of 0.5 μm. The holder model number was SGWR1212. A width (C) of the land surface was 0.03 mm. A maximum depth (H) of a recess was 100 μm. A distance (A) was 0.4 mm. A distance (D) was 0.85 mm. A projection height (F) was 0.15 mm. An inclination angle (θ2) of the rake face was 25°. A drawing angle (θ1) was 15°.

TABLE 3

| Sample No. | Length (B) of straight portion (mm) | Chip length (mm) | Flank face wear amount (mm) |
|---|---|---|---|
| 3A | 0.05 | 300 or more | 0.061 |
| 3B | 0.15 | 70 to 120 | 0.065 |
| 3C | 0.35 | 30 to 80 | 0.069 |
| 3D | 0.50 | 30 to 80 | 0.068 |
| 3E | 0.60 | 20 to 60 | 0.101 |

As shown in Table 3, when the cutting insert with sample number 3A was used, a chip length was 300 mm or more. When the length of the straight portion is as small as about 0.05 mm, in the processing with a cutting depth of 0.1 mm, the lateral breaker wall surface portion has a recessed shape, and accordingly, a substantial breaker width increases, so that a chip cannot be divided into short pieces. Also, it is conceivable that in the processing with a cutting depth of 1.5 mm, an area for contact with a chip is excessively small, thus reducing the stability of a chip.

When the cutting insert with sample number 3E was used, the wear amount of a flank face becomes greater than when another cutting insert was used. When the length of a straight portion becomes as large as about 0.60 mm, the following is conceivable. An effect of reducing a chip contact area cannot be obtained sufficiently, and a cutting fluid cannot be supplied sufficiently to the blade tip, so that a chip length meaning a tool life is poorer than when another cutting insert was used. The above results confirmed that setting the length (B) of the straight portion of the cutting insert to 0.15 mm or more can effectively reduce a chip length. Also, it was confirmed that setting the length (B) of the straight portion of the cutting insert to 0.50 mm or less can effectively reduce the wear amount of a flank face.

Example 4

In this example, an effect of a distance (D) from front breaker wall surface portion 24c to front land surface portion 9c on the curl diameter of a chip was examined. First, cutting inserts with sample numbers 4A to 4F were prepared. Distances (D) of the cutting inserts with sample numbers 4A to 4F are 0.15 mm, 0.3 mm, 0.7 mm, 1.1 mm, 1.5 mm, and 2.0 mm, respectively.

As illustrated in FIGS. 9 and 10, a workpiece was grooved with cutting insert 30. The feed direction of cutting insert 30 is a direction perpendicular to the rotation axis of the workpiece.

<Cutting Conditions>

A workpiece was an aluminum alloy A5056 having a cylindrical shape. The size of the workpiece was a diameter of 20 mm by a length of 60 mm. A cutting method was grooving. A cutting manner was wet cutting. A cutting distance was 200 m. The peripheral surface speed of a workpiece was 350 m/min. Grooving was performed for the entire groove width. The grooving depth was 10 mm in diameter. A tool feed speed was 0.12 mm/rev.

<Tool Shape>

The tool was a PCD multi-function tool having a groove width of 2.5 mm by a lateral cutting edge length of 6.0 mm. The material for the tool was a polycrystalline hard sintered compact containing 90 vol % of diamond having an average particle size of 0.5 μm. The holder model number was SGWR1212. A width (C) of the land surface was 0.07 mm. A maximum depth (H) of a recess was 100 μm. A distance (A) was 0.4 mm. A projection height (F) was 0.1 mm. An inclination angle (θ2) of the rake face was 25°. A drawing angle (θ1) was 15°.

TABLE 4

| Sample No. | Distance (D) (mm) | Curl diameter of chip (mm) (chip state) |
|---|---|---|
| 4A | 0.15 | 50 or more (irregular) |
| 4B | 0.3 | 10 or less (spiral) |
| 4C | 0.7 | 10 or less (spiral) |
| 4D | 1.1 | 10 or less (spiral) |
| 4E | 1.5 | 20 or less (spiral) |
| 4F | 2.0 | 30 to 50 (irregular) |

As shown in Table 4, when the cutting insert with sample number 4A was used, the curl diameter of a chip was 50 mm or more, and the chip state was irregular. When the cutting insert with sample number 4A was used, the following is conceivable. Since a chip overlaps onto the upper surface of the edge portion due to an excessively small breaker width, it is difficult to control the chip. When the cutting insert with sample number 4F was used, the curl diameter of a chip was 30 to 50 mm, and the chip state was is irregular. When the cutting insert with sample number 4F was used, the following is conceivable. Since the breaker width is excessively large, the chip does not contact the front breaker wall surface, and the chip accordingly cannot be controlled stably, so that irregular curling is exhibited.

In contrast, when the cutting inserts with sample numbers 4B to 4E were used, the curl diameter of a chip was 20 mm or less, and the chip state was spiral. The above results confirmed that setting the distance (D) of the cutting insert to 0.3 mm or more and 1.5 mm or less can reduce the curl diameter of a chip and allows the chip to have a spiral shape.

Example 5

In this example, effects of a height (F) of projection 15 on the curl diameter of a chip and the state of the projection were examined. First, cutting inserts with sample numbers 5A to 5E were prepared. The heights (F) of projections 15 of the cutting inserts with sample numbers 5A to 5F are 0.05 mm, 0.10 mm, 0.20 mm, 0.35 mm, 0.50 mm, and 0.60 mm, respectively.

As illustrated in FIGS. 9 and 10, a workpiece was grooved with cutting insert 30. The feed direction of cutting insert 30 is a direction perpendicular to the rotation axis of the workpiece.

<Cutting Conditions>

A workpiece was an aluminum alloy ADC12 having a cylindrical shape. The size of the workpiece was a diameter of 50 mm by a length of 50 mm. A cutting method was grooving. A cutting manner was wet cutting. A cutting distance was 150 m. The peripheral surface speed of a workpiece was 400 m/min. Grooving was performed for the entire groove width. A tool grooving depth was 6 mm in diameter. A tool feed speed was 0.07 mm/rev.

<Tool Shape>

The tool was a PCD multi-function tool having a groove width of 2.5 mm by a lateral cutting edge length of 4.5 mm. The material for the tool was a polycrystalline hard sintered compact containing 90 vol % of diamond having an average particle size of 0.5 μm. The holder model number was SGWR1212. A width (C) of the land surface was 0.03 mm. A maximum depth (H) of a recess was 100 μm. A distance (A) was 0.4 mm. A distance (D) was 0.85 mm. An inclination angle (θ2) of the rake face was 25°. A drawing angle (θ1) was 15°.

TABLE 5

| Sample No. | Height (F) of projection (mm) | Curl diameter of chip (mm) (chip state) | State of projection |
|---|---|---|---|
| 5A | 0.05 | 50 or more (irregular) | Projection and its periphery were welded |
| 5B | 0.10 | 10 or less (spiral) | No abnormality |
| 5C | 0.20 | 10 or less (spiral) | No abnormality |
| 5D | 0.35 | 10 or less (spiral) | No abnormality |
| 5E | 0.50 | 10 or less (spiral) | No abnormality |
| 5F | 0.60 | 30 to 50 (irregular) | Tip of projection chipped |

As shown in Table 5, when the cutting insert with sample number 5A was used, the curl diameter of a chip was 50 mm or more, and the chip state was irregular. Also, the projection portion and its periphery were welded. When the cutting insert with sample number 5A was used, the following is conceivable. Since the projection height is excessively small, the chip contacts the entire front breaker wall surface portion, and it is difficult to supply a cutting fluid to the blade tip. This increase a cutting resistance, leading to welding. When the cutting insert with sample number 5F was used, the curl diameter of a chip was 30 to 50 mm, and the chip state was irregular. Also, the tip of the projection was chipped. When the cutting insert with sample number 5F was used, the following is conceivable. The tip of the projection becomes sharp to reduce its strength, and the tip is accordingly chipped, which makes it difficult to control the chip.

In contrast, when the cutting inserts with sample numbers 5B to 5E were used, the curl diameter of a chip was 10 mm or less, and the chip state was spiral. No abnormality was found in the projection. The above results confirmed that setting the height (F) of projection 15 of the cutting insert to 0.10 mm or more and 0.50 mm or less reduces the curl diameter of a chip, allowing the chip to have a spiral shape. It was also confirmed that the occurrence of abnormality of the projection can be prevented or reduced.

Example 6

In this example, effects of a spacing (A) between each of the pair of protruding portions 12a and 12b and a corresponding one of the pair of lateral land surface portions 9a and 9b on a chip length were examined. First, cutting inserts with sample numbers 6A to 6F were prepared. Spacings (A) of the cutting inserts with sample numbers 6A to 6F are 0.10 mm, 0.15 mm, 0.30 mm, 0.50 mm, 0.70 mm, and 0.80 mm, respectively.

As illustrated in FIGS. 14 and 15, outside-diameter cross-feeding was performed on a workpiece with cutting insert 30. The feed direction of cutting insert 30 is a direction parallel to the rotation axis of a workpiece.

<Cutting Conditions>

A workpiece was an aluminum alloy A2014 having a cylindrical shape. The size of the workpiece was a diameter of 20 mm by a length of 50 mm. A cutting method was outside-diameter cross-feeding. A cutting manner was wet cutting. A cutting distance was 200 m. The peripheral surface speed of a workpiece was 250 m/min. A tool cutting depth was 0.7 mm. A tool feed speed was 0.10 mm/rev.

<Tool Shape>

The tool was a PCD multi-function tool having a groove width of 2.5 mm by a lateral cutting edge length of 4.5 mm. The material for the tool was a polycrystalline hard sintered compact containing 90 vol % of diamond having an average particle size of 0.5 μm. The holder model number was SGWR1212. A width (C) of the land surface was 0.03 mm. A maximum depth (H) of a recess was 100 μm. A distance (D) was 0.85 mm. A projection height (F) was 0.25 mm. An inclination angle (θ2) of the rake face was 25°. A drawing angle (θ1) was 15°.

TABLE 6

| Sample No. | Spacing (A) (mm) | Chip length (mm) |
| --- | --- | --- |
| 6A | 0.10 | 300 or more |
| 6B | 0.15 | 30 to 80 |
| 6C | 0.30 | 50 to 100 |
| 6D | 0.50 | 50 to 100 |
| 6E | 0.70 | 80 to 130 |
| 6F | 0.80 | 300 or more |

As shown in Table 6, when the cutting inserts with sample numbers 6A and 6F were used, a chip length was 300 mm or more. When the cutting insert with sample number 6A was used, the following is conceivable. The chip overlaps onto the upper surface of the edge portion due to an excessively small breaker width, which makes it difficult to control the chip. When the cutting insert with sample number 6F was used, the following is conceivable. Since the breaker width is excessively large, the chip contacts the lateral breaker wall surface insufficiently, and distortion accordingly cannot be provided sufficiently, resulting in a long chip. In contrast, when the cutting inserts with sample numbers 6B to 6E were used, the chip lengths were 30 to 130 mm. The above results confirmed that setting the spacing (A) of a cutting insert to 0.15 mm or more and 0.70 mm or less can effectively reduce a chip length.

Example 7

In this example, effects of a width (C) of the lateral land surface portion on a chip length and a flank face wear amount were examined. First, cutting inserts with sample numbers 7A to 7F were prepared. The widths (C) of the lateral land surface portions of the cutting inserts with sample numbers 7A to 7F are 5 μm, 10 μm, 30 μm, 50 μm, 100 μm, and 120 μm, respectively.

As illustrated in FIGS. 14 and 15, outside-diameter cross-feeding was performed on a workpiece with cutting insert 30. The feed direction of cutting insert 30 is a direction parallel to the rotation axis of a workpiece.

<Cutting Conditions>

A workpiece was an aluminum alloy A6061 having a cylindrical shape. The size of the workpiece was a diameter of 10 mm by a length of 40 mm. A cutting method was outside-diameter cross-feeding. A cutting manner was wet cutting. A cutting distance was 200 m. The peripheral surface speed of a workpiece was 200 m/min. A tool cutting depth was 1.0 mm. A tool feed speed was 0.15 mm/rev.

<Tool Shape>

The tool was a PCD multi-function tool having a groove width of 2.5 mm by a lateral cutting edge length of 4.5 mm. The material for the tool was a polycrystalline hard sintered compact containing 90 vol % of diamond having an average particle size of 0.5 μm. The holder model number was SGWR1212. A maximum depth (H) of the land surface was 100 μm. A depth (D) was 1.0 mm. A projection height (F) was 0.2 mm. An inclination angle (θ2) of the rake face was 25°. A drawing angle (θ1) was 15°.

TABLE 7

| Sample No. | Width of lateral land surface portion (C) (μm) | Chip length (mm) | Flank face wear amount (mm) |
| --- | --- | --- | --- |
| 7A | 5 | 250 to 350 | 0.045 (blade tip chipped) |
| 7B | 10 | 30 to 80 | 0.014 |
| 7C | 30 | 30 to 80 | 0.014 |
| 7D | 50 | 30 to 80 | 0.012 |
| 7E | 100 | 30 to 120 | 0.015 |
| 7F | 120 | 200 to 300 | 0.012 |

As shown in Table 7, when the cutting insert with sample number 7A was used, a chip length was 250 to 350 mm, and a flank face wear amount was 0.045 mm. Also, the blade tip was chipped. When the cutting insert with sample number 7A was used, the following is conceivable. Since the blade tip becomes sharp whereas its strength decreases, a chip cannot be controlled normally due to the occurrence of chipping at the blade tip. When the cutting insert with sample number 7F was used, a chip length was 200 to 300 mm, and a flank face wear amount was 0.012 mm. When the cutting insert with sample number 7F was used, the following is conceivable. Since a chip flows into a breaker recess less easily, the chip cannot be controlled sufficiently, so that the chip becomes longer. This results in an irregular curl diameter.

In contrast, when the cutting inserts with sample numbers 7B to 7E were used, a chip length was 30 to 120 mm, and a flank face wear amount was 0.012 to 0.015 mm. The above results confirmed that setting the width (C) of the lateral land surface portion of the cutting insert to 10 μm or more and 100 μm less can effectively reduce both of the chip length and the flank face wear amount.

Example 8

In this example, effects of an inclination angle (θ2) of a rake face on a chip length and a flank face wear amount were examined. First, cutting inserts with sample numbers 8A to 8F were prepared. Inclination angles (θ2) of the rake faces of the cutting inserts with sample numbers 8A to 8F are 10°, 15°, 25°, 35°, 45°, and 55, respectively.

As illustrated in FIGS. 14 and 15, outside-diameter cross-feeding was performed on a workpiece with cutting insert 30. The feed direction of cutting insert 30 is a direction parallel to the rotation axis of a workpiece.

<Cutting Conditions>

A workpiece was an aluminum alloy A6061 having a cylindrical shape. The size of the workpiece was a diameter of 30 mm by a length of 60 mm. A cutting method was outside-diameter cross-feeding. A cutting manner was wet cutting. A cutting distance was 200 m. The peripheral surface speed of a workpiece was 500 m/min. A tool cutting depth was 0.5 mm. A tool feed speed was 0.08 mm/rev.

<Tool Shape>

The tool was a PCD multi-function tool having a groove width of 2.5 mm by a lateral cutting edge length of 4.5 mm. The material for the tool was a polycrystalline hard sintered compact containing 90 vol % of diamond having an average particle size of 0.5 μm. The holder model number was SGWR1212. A width (C) of the land surface was 0.03 mm. A maximum depth (H) of the recess was 150 μm. A distance (A) was 0.4 mm. A distance (D) was 0.85 mm. A projection height (F) was 0.15 mm. A drawing angle (θ1) was 15°.

TABLE 8

| Sample No. | Inclination angle (θ2) (°) | Chip length (mm) | Flank face wear amount (mm) |
| --- | --- | --- | --- |
| 8A | 10 | 200 to 300 | 0.019 |
| 8B | 15 | 80 to 130 | 0.015 |
| 8C | 25 | 50 to 100 | 0.018 |
| 8D | 35 | 50 to 100 | 0.018 |
| 8E | 45 | 50 to 100 | 0.020 |
| 8F | 55 | 150 to 300 | 0.051 (blade tip chipped) |

As shown in Table 8, when the cutting insert with sample number 8A was used, a chip length was 200 to 300 mm, and a flank face wear amount was 0.019 mm. When the cutting insert with sample number 8A was used, the following is conceivable. Since the breaker depth gradually decreases as a rake angle decreases with a constant breaker width, a sufficient recess space into which a chip flows cannot be obtained, so that the chip cannot be divided into short pieces. When the cutting insert with sample number 8F was used, a chip length was 150 to 300 mm, and a flank face wear amount was 0.051 mm. Also, the blade tip was chipped. When the cutting insert with sample number 8F was used, the following is conceivable. Since the blade tip becomes sharp whereas its strength decreases, a chip cannot be controlled normally due to the occurrence of chipping at the blade tip.
which makes it difficult to normally control a chip due to chipping at the blade tip.

In contrast, when the cutting inserts with sample numbers 8B to 8E were used, a chip length was 50 to 130 mm, and a flank face wear amount was 0.015 to 0.020 mm. The above results confirmed that setting the inclination angle (θ2) of the rake face of the cutting insert to 15° or more and 45° or less effectively reduces both the chip length and the flank face wear amount.

Example 9

In this example, effects of a maximum depth (E) of a chip breaker recess on a chip length and a flank face wear amount were examined. First, cutting inserts with sample numbers 9A to 9F were prepared. Maximum depths (E) of the chip breaker recesses of the cutting inserts with sample numbers 9A to 9F are 30 μm, 60 μm, 100 μm, 150 μm, 200 μm, and 250 μm, respectively.

As illustrated in FIGS. 14 and 15, outside-diameter cross-feeding was performed on a workpiece with cutting insert 30. The feed direction of cutting insert 30 is a direction parallel to the rotation axis of a workpiece.

<Cutting Conditions>

A workpiece was an aluminum alloy A6061 having a cylindrical shape. The size of the workpiece was a diameter of 20 mm by a length of 60 mm. A cutting method was outside-diameter cross-feeding. A cutting manner was wet cutting. A cutting distance was 200 m. The peripheral surface speed of a workpiece was 300 m/min. A tool cutting depth was 0.7 mm. A tool feed speed was 0.10 mm/rev.

<Tool Shape>

The tool was a PCD multi-function tool having a groove width of 2.5 mm by a lateral cutting edge length of 4.5 mm. The material for the tool was a polycrystalline hard sintered compact containing 90 vol % of diamond having an average particle size of 0.5 μm. The holder model number was SGWR1212. A width (C) of the land surface was 0.03 mm. A distance (A) was 0.6 mm. A distance (D) was 0.85 mm. A projection height (F) was 0.15 mm. An inclination angle (θ2) of the rake face was 25°. A drawing angle (θ1) was 15°.

TABLE 9

| Sample No. | Maximum depth of recess (H) (μm) | Chip length (mm) | Flank face wear amount (mm) |
| --- | --- | --- | --- |
| 9A | 30 | 250 to 350 | 0.021 |
| 9B | 60 | 80 to 150 | 0.025 |
| 9C | 100 | 50 to 120 | 0.023 |
| 9D | 150 | 80 to 150 | 0.022 |
| 9E | 200 | 80 to 150 | 0.026 |
| 9F | 250 | 150 to 300 | 0.050 (blade tip chipped) |

As shown in Table 9, when the cutting insert with sample number 9A was used, a chip length was 250 to 350 mm, and a flank face wear amount was 0.021 mm. When the cutting insert with sample number 9A was used, the following is conceivable. Since a sufficient space for curling a chip cannot be achieved due to an excessively shallow breaker recess, chip processability decreases. When the cutting insert with sample number 9F was used, a chip length was 150 to 300 mm, and a flank face wear amount was 0.050 mm. Also, the blade tip was chipped. When the cutting insert with sample number 9F was used, the following is conceivable. The strength of the blade tip decreases due to a deepened breaker recess, and the blade tip accordingly chips, which makes it difficult to desirably control the chip.

In contrast, when the cutting inserts with sample numbers 9B to 9E were used, a chip length was 50 to 150 mm, and a flank face wear amount was 0.022 to 0.026 mm. The above results confirmed that setting the maximum depth (E) of the chip breaker recess of the cutting insert to 60 μm or more and 200 μm or less effectively reduces both the chip length and the flank face wear amount.

Example 10

In this example, effects of a drawing angle (θ1) of a protruding portion on the curl diameter of a chip and the quality of a machined groove wall surface were examined. First, cutting inserts with sample numbers 10A to 1° F. were prepared. Drawing angles (θ1) of the protruding portions of the cutting inserts with sample numbers 10A to 1° F. are 2°, 5°, 15°, 25°, 35°, and 45°, respectively.

As illustrated in FIGS. 9 and 10, a workpiece was grooved with cutting insert 30. The feed direction of cutting insert 30 is a direction perpendicular to the rotation axis of a workpiece.

<Cutting Conditions>

A workpiece was an aluminum alloy A6061 having a cylindrical shape. The size of the workpiece was a diameter of 30 mm by a length of 60 mm. A cutting method was grooving. A cutting manner was wet cutting. A cutting distance was 200 m. The peripheral surface speed of a workpiece was 250 m/min. A tool cutting depth was 8 mm in diameter. A tool feed speed was 0.07 mm/rev.

<Tool Shape>

The tool was a PCD multi-function tool having a groove width of 2.5 mm by a lateral cutting edge length of 4.5 mm. The material for the tool was a polycrystalline hard sintered compact containing 90 vol % of diamond having an average particle size of 0.5 μm. The holder model number was SGWR1212. A width (C) of the land surface was 0.03 mm. A maximum depth (H) of a recess was 10 μm. A distance (A) was 0.4 mm. A distance (D) was 0.85 mm. A projection height (F) was 0.15 mm. An inclination angle (θ2) of the rake face was 25°.

TABLE 10

| Sample No. | Drawing angle (θ1) (°) | Curl diameter of chip (mm) (chip state) | Quality of machined groove wall surface |
| --- | --- | --- | --- |
| 10A | 2 | 10 or less (spiral) | Flaw, gouge |
| 10B | 5 | 10 or less (spiral) | Good |
| 10C | 15 | 10 or less (spiral) | Good |
| 10D | 25 | 10 or less (spiral) | Good |
| 10E | 35 | 20 or less (spiral) | Good |
| 10F | 45 | 30 to 50 (irregular) | Flaw, gouge |

As shown in Table 10, when the cutting insert with sample number 10A was used, the curl diameter of a chip was 10 mm or less, and the chip state was spiral. However, a flow and gouge were caused on the wall surface of a machined groove. When the cutting insert with sample number 10A was used, the following is conceivable. The chip curves less due to drawing, and a flow or gouge was caused by rubbing the machined wall surface. When the cutting insert with sample number 10F was used, the curl diameter of a chip was 30 to 50 mm, and the chip state was irregular. Also, a flow and gouge were caused on the wall surface of the machined groove. When the cutting insert with sample number 10F was used, the following is conceivable. An excessively high drawing effect inhibits a flow of a chip, which may cause clogging or welding of the chip.

In contrast, when the cutting inserts with sample numbers 10B to 10E were used, the curl diameter of a chip was 20 mm or less, and the chip state was spiral. Also, the quality of the wall surface of the machined groove was good. The above results confirmed that setting the drawing angle (θ1) of the protruding portion of the cutting insert to 5° or more and 35° or less can reduce the curl diameter of a chip, allowing the chip to have a spiral shape. Also, the quality of a machined groove wall surface was good.

Although the above has described the case in which first lateral rake face portion 11a is continuous with first lateral breaker wall surface portion 24a via first bottom surface 23a, second lateral rake face portion 11b is continuous with second lateral breaker wall surface portion 24b via second bottom surface 23b, and front rake face portion 11c is continuous with front breaker wall surface portion 24c via third bottom surface 23c, the present invention is not limited to this case. Depending on the width of chip breaker recess 10 and the angle of a rake face, edge portion 2 may not have any one of first bottom surface 23a, second bottom surface 23b, and third bottom surface 23c. In other words, first lateral rake face portion 11a may be directly continuous with first lateral breaker wall surface portion 24a. Second lateral rake face portion 11b may be directly continuous with second lateral breaker wall surface portion 24b. Front rake face portion 11c may be directly continuous with front breaker wall surface portion 24c.

It should be understood that the embodiments and examples disclosed herein have been presented for the purpose of illustration and non-restrictive in every respect. It is intended that the scope of the present invention is not limited to the description above but defined by the scope of the claims and encompasses all modifications equivalent in meaning and scope to the claims.

REFERENCE SIGNS LIST 1 body, 2 edge portion, 4 upper surface, 5 front side surface, 6 lateral side surface, 6a first lateral side surface, 6b second lateral side surface, 7 front cutting edge, 8 lateral cutting edge, 8a first lateral cutting edge, 8b second lateral cutting edge, 9 land surface, 9a first lateral land surface portion, 9b second lateral land surface portion, 9c front land surface portion, 10 chip breaker recess, 10a first recess, 10b second recess, 10c third recess, 11 rake face, 11a first lateral rake face portion, 11b second lateral rake face portion, 11c front lateral rake face portion, 12 protruding portion, 12a first protruding portion, 12b second protruding portion, 15 projection, 20 fastening hole, 22a first inclined surface, 22b second inclined surface, 23a first bottom surface, 23b second bottom surface, 23c third bottom surface (deepest portion), 24 breaker wall surface, 24a first lateral breaker wall surface portion, 24b second lateral breaker wall surface portion, 24c front breaker wall surface portion, 26a, 26b tip, 29a, 29b upper end, 27 third inclined surface, 28 fourth inclined surface, 30 cutting insert, 30a first straight portion, 30b second straight portion, 31 front edge portion, 32 side surface, 33 recess, 33a, 33b boundary, 34 protrusion, 35a first inclined portion, 35b second inclined portion, 40 holding member.

The invention claimed is:

1. A cutting insert comprising:
a body; and
an edge portion provided on the body,
the edge portion including an upper surface, a side surface, and a land surface,
the side surface having a front side surface and a pair of lateral side surfaces adjacent to the front side surface,
an intersection between the land surface and the front side surface forming a front cutting edge,
an intersection between the land surface and each of the pair of lateral side surfaces forming a corresponding one of a pair of lateral cutting edges,
the edge portion containing 80 vol % or more of diamond,
a chip breaker recess being provided between the upper surface and the land surface,
surfaces forming the chip breaker recess including a rake face continuous with the land surface and a breaker wall surface continuous with the upper surface,
the upper surface having a front edge portion opposite to the front cutting edge from the chip breaker recess,
a pair of protruding portions being provided to extend from the front edge portion toward the front cutting edge,
the breaker wall surface has a front breaker wall surface portion that is sandwiched between the pair of protruding portions and is continuous with the front edge portion,
in plan view, a distance from the front breaker wall surface portion to the land surface in a direction perpendicular to a direction in which the front cutting edge extends is 0.3 mm or more and 1.5 mm or less, and
the front breaker wall surface portion is formed of a plurality of projections.

2. The cutting insert according to claim 1, wherein each of the pair of protruding portions is continuous with the land surface.

3. The cutting insert according to claim 2, wherein a value obtained by dividing a sum of a length of a boundary between one of the pair of protruding portions and the land surface and a length of a boundary between the other of the pair of protruding portions and the land surface by a length of the front cutting edge is 0.1 or less.

4. The cutting insert according to claim 1, wherein each of the pair of protruding portions is apart from the land surface.

5. The cutting insert according to claim 4, wherein in a cross-section that passes through a tip of each of the pair of protruding portions and is perpendicular to a direction in which the front cutting edge extends, a value obtained by dividing a height from a lowest position of each of the pair of protruding portions to a deepest portion of the chip breaker recess by a depth of the chip breaker recess at the deepest portion is 0.3 or more and less than 1.0.

6. The cutting insert according to claim 1, wherein a spacing between the pair of protruding portions decreases as apart from the front cutting edge.

7. The cutting insert according to claim 1, wherein in plan view, a height of each of the plurality of projections in the direction perpendicular to the direction in which the front cutting edge extends is 0.1 mm or more and 0.5 mm or less.

8. The cutting insert according to claim 1, wherein
the land surface has a pair of lateral land surface portions each continuous with a corresponding one of the pair of lateral side surfaces, and
in plan view, a spacing between each of the pair of protruding portions and a corresponding one of the pair of lateral land surface portions in a direction perpendicular to a direction in which the lateral cutting edge extends is 0.15 mm or more and 0.7 mm or less.

9. The cutting insert according to claim 8, wherein a width of each of the pair of lateral land surface portions in a direction perpendicular to a direction in which each of the pair of lateral cutting edges extends is 10 μm or more and 100 μm or less.

10. The cutting insert according to claim 1, wherein
the land surface has a front land surface portion continuous with the front side surface, and
in plan view, a width of the front land surface portion in a direction perpendicular to a direction in which the front cutting edge extends is 10 μm or more and 100 μm or less.

11. The cutting insert according to claim 1, wherein an inclination angle of the rake face to the land surface is 15° or more and 45° or less.

12. The cutting insert according to claim 1, wherein a maximum depth of the chip breaker recess is 60 μm or more and 200 μm or less.

13. The cutting insert according to claim 1, wherein in plan view, a drawing angle of each of the pair of protruding portions is 5° or more and 35° or less.

14. The cutting insert according to claim 1, wherein
the breaker wall surface has a pair of lateral breaker wall surface portions each facing a corresponding one of the pair of lateral cutting edges, and
each of the pair of lateral breaker wall surface portions is formed of recesses and protrusions alternately arranged parallel to a corresponding one of the pair of lateral cutting edges.

15. The cutting insert according to claim 14, wherein
each of the pair of protruding portions has a corresponding one of a pair of straight portions which is parallel to a corresponding one of the pair of lateral cutting edges, and
a length of each of the pair of straight portions is 0.15 mm or more and 0.5 mm or less.

16. The cutting insert according to claim 15, wherein each of the pair of straight portions is located on a front cutting edge side.

17. A cutting insert comprising:
a body; and
an edge portion provided on the body,
the edge portion including an upper surface, a side surface, and a land surface,
the side surface having a front side surface and a pair of lateral side surfaces adjacent to the front side surface,
an intersection between the land surface and the front side surface forming a front cutting edge,
an intersection between the land surface and each of the pair of lateral side surfaces forming a corresponding one of a pair of lateral cutting edges,
the edge portion containing 80 vol % or more of diamond,
a chip breaker recess being provided between the upper surface and the land surface,
surfaces forming the chip breaker recess including a rake face continuous with the land surface and a breaker wall surface continuous with the upper surface, the upper surface having a front edge portion opposite to the front cutting edge from the chip breaker recess, a pair of protruding portions being provided to extend from the front edge portion toward the front cutting edge, each of the pair of protruding portions is apart from the land surface, and in a cross-section that passes through a tip of each of the pair of protruding portions and is perpendicular to a direction in which the front cutting edge extends, a value obtained by dividing a height from a lowest position of each of the pair of protruding portions to a deepest portion of the chip breaker recess by a depth of the chip breaker recess at the deepest portion is 0.3 or more and less than 1.0.

* * * * *